United States Patent
Wang

(10) Patent No.: US 10,021,394 B2
(45) Date of Patent: Jul. 10, 2018

(54) HYPOTHETICAL REFERENCE DECODER PARAMETERS IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 220 days.

(21) Appl. No.: 13/918,041

(22) Filed: Jun. 14, 2013

(65) Prior Publication Data

US 2014/0086336 A1 Mar. 27, 2014

Related U.S. Application Data

(60) Provisional application No. 61/705,102, filed on Sep. 24, 2012.

(51) Int. Cl.
H04N 19/187 (2014.01)
H04N 19/196 (2014.01)
H04N 19/136 (2014.01)
H04N 19/70 (2014.01)
H04N 19/149 (2014.01)
H04N 19/152 (2014.01)
(Continued)

(52) U.S. Cl.
CPC ......... *H04N 19/136* (2014.11); *H04N 19/149* (2014.11); *H04N 19/152* (2014.11); *H04N 19/31* (2014.11); *H04N 19/44* (2014.11); *H04N 19/70* (2014.11)

(58) Field of Classification Search
USPC .................................................. 375/240.26
See application file for complete search history.

(56) References Cited

U.S. PATENT DOCUMENTS 8,107,744 B2 1/2012 Tian et al.
8,165,216 B2 4/2012 Chen et al.
9,179,157 B2 11/2015 Zhu et al.
(Continued)

FOREIGN PATENT DOCUMENTS

CN 1787640 A 6/2006
CN 101201771 A 6/2008
(Continued)

OTHER PUBLICATIONS

Y-K Wang (BoG Chair): "Report of BoG on high-level syntax for extension planning", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/, No. JCTVC-J0574, Jul. 19, 2012 (Jul. 19, 2012), XP030112936.*

(Continued)

*Primary Examiner* — Patrick Demosky
(74) *Attorney, Agent, or Firm* — Shumaker & Sieffert, P.A.

(57) ABSTRACT

A computing device selects, from among a set of hypothetical reference decoder (HRD) parameters in a video parameter set and a set of HRD parameters in a sequence parameter set, a set of HRD parameters applicable to a particular operation point of a bitstream. The computing device performs, based at least in part on the set of HRD parameters applicable to the particular operation point, an HRD operation on a bitstream subset associated with the particular operation point.

19 Claims, 6 Drawing Sheets

(51) Int. Cl.
H04N 19/44 (2014.01)
H04N 19/31 (2014.01)

(56) References Cited

U.S. PATENT DOCUMENTS

| | | | |
|---|---|---|---|
| 2004/0005007 A1* | 1/2004 | Viscito | H04N 21/23406 375/240.25 |
| 2005/0254575 A1 | 11/2005 | Hannuksela et al. | |
| 2006/0120463 A1* | 6/2006 | Wang | H04N 19/70 375/240.25 |
| 2007/0086521 A1 | 4/2007 | Wang et al. | |
| 2007/0230564 A1 | 10/2007 | Chen et al. | |
| 2008/0137742 A1 | 6/2008 | Chen et al. | |
| 2008/0304520 A1 | 12/2008 | Hannuksela et al. | |
| 2009/0003431 A1* | 1/2009 | Zhu | H04N 21/23432 375/240.01 |
| 2009/0003534 A1 | 1/2009 | Allen, Jr. et al. | |
| 2009/0180545 A1 | 7/2009 | Wu et al. | |
| 2010/0091837 A1 | 4/2010 | Zhu et al. | |
| 2010/0091882 A1 | 4/2010 | Luo et al. | |
| 2010/0098154 A1 | 4/2010 | Lou et al. | |
| 2010/0142613 A1 | 6/2010 | Zhu | |
| 2010/0153395 A1 | 6/2010 | Hannuksela et al. | |
| 2010/0189182 A1 | 7/2010 | Hannuksela | |
| 2010/0195738 A1 | 8/2010 | Zhu et al. | |
| 2010/0208796 A1 | 8/2010 | Luo et al. | |
| 2010/0232517 A1 | 9/2010 | Chang | |
| 2011/0032999 A1 | 2/2011 | Chen et al. | |
| 2011/0075989 A1 | 3/2011 | Hattori | |
| 2011/0216837 A1 | 9/2011 | Luo et al. | |
| 2012/0023249 A1 | 1/2012 | Chen et al. | |
| 2012/0183076 A1 | 7/2012 | Boyce et al. | |
| 2012/0183077 A1 | 7/2012 | Hong et al. | |
| 2013/0034170 A1 | 2/2013 | Chen et al. | |
| 2013/0114670 A1 | 5/2013 | Chen et al. | |
| 2013/0287093 A1* | 10/2013 | Hannuksela | H04N 19/00769 375/240.02 |
| 2014/0003489 A1 | 1/2014 | Hannuksela et al. | |
| 2014/0003534 A1* | 1/2014 | Haque | H04N 19/597 375/240.25 |
| 2014/0022343 A1* | 1/2014 | Chen | H04N 19/70 348/43 |
| 2014/0086303 A1 | 3/2014 | Wang | |
| 2014/0086331 A1 | 3/2014 | Wang | |
| 2014/0086332 A1 | 3/2014 | Wang | |
| 2014/0192893 A1 | 7/2014 | Sullivan et al. | |
| 2014/0301477 A1 | 10/2014 | Deshpande | |

FOREIGN PATENT DOCUMENTS

| | | |
|---|---|---|
| CN | 101578867 A | 11/2009 |
| CN | 101663893 A | 3/2010 |
| KR | 20090106502 A | 10/2009 |
| RU | 2310290 C2 | 11/2007 |
| RU | 2406254 C2 | 12/2010 |
| TW | 200829034 A | 7/2008 |
| TW | 200838315 A | 9/2008 |
| TW | 201009701 A | 3/2010 |
| WO | 2007115129 | 10/2007 |
| WO | 2013004911 A1 | 1/2013 |
| WO | 2013030458 A1 | 3/2013 |

OTHER PUBLICATIONS

Benjamin Bross et al.: "High efficiency video coding (HEVC) text specification draft 8 (JCTVC-J1003_d7)", Joint Collaborative Team on Video Coding (JCT-VC) of ITU-T SG1 WP3 and ISO/IEC JTC1/SC29/WG11 10th Meeting: Stockholm, Jul. 28, 2012 (Jul. 28, 2012), pp. 1-250, XP055093210.*

Hannuksela et al.: "AHG10 Hooks for Scalable Coding: Sequence Parameter Set Design", Joint Collaborative Team on Video Coding (JCT-VC) of ITU-T SG 16 WP 3 and ISO/IEC JTC 1/SC 29/WG 11 10th meeting: Stockholm, SE, Jul. 11-20, 2012.*

Benjamin Bross et al.: "High efficiency video coding (HEVC) text specification draft 8" (JCTVC-J1003_d7), Joint Collaborative Team on Video Coding (JCT-VC) of ITU-T SG1 WP3 and ISO/IEC JTC1/SC29/WG11 10th Meeting: Stockholm, Jul. 28, 2012 (Jul. 28, 2012), pp. 1-250, XP055093210.*

Y-K Wang (BoG Chair): "Report of BoG on high-level syntax for extension planning", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL:HTTP://WFTP3.ITU.INT/AV-ARCH/JCTVC-SITE/, No. JCTVC-J0574, Jul. 19, 2012 (Jul. 19, 2012), XP030112936.*

Hannuksela et al: "AHG10 Hooks for Scalable Coding: Sequence Parameter Set Design", Joint Collaborative Team on Video Coding (JCTVC-VC) of ITU-T SG 16 WP 3 adnd ISO-IEC JTC 1/SC 29/WG11 $10^{th}$ meeting: Stockholm, SE, Jul. 11-20, 2012.*

Benjamin Bross et al: "High efficiency video coding (HEVC) text specification draft 8" (JCTVC-J1003_d7), Joint Collaborative Team on Video Coding (JCT-VC) of ITU-T SG1 WPE and ISO/IEC JTC1/SC29/WG11 $10^{th}$ meeting: Stockholm, Jul. 28, 2012 (Jul. 28, 2012), pp. 1-250, XP055093210.*

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "AHG10: On video parameter set for HEVC extensions," JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-J0124, XP030112486, 15 pp.

Chou, et al., "A generalized hypothetical reference decoder for H.264/AVC," IEEE Transactions on Circuits and Systems for Video Technology, IEEE Service Center, Piscataway, NJ, US, vol. 13, No. 7, Jul. 1, 2003, pp. 674-687, XP011099259, ISSN: 1051-8215, DOI:10.1109/TCSVT.2003.814965.

Deshpande, et al., "An Improved Hypothetical Reference Decoder for HEVC," Proc. SPIE 8666, Visual Information Processing and Communication IV, Feb. 21, 2013, pp. 866608-1 to 866608-9, vol. 8666.

International Search Report and Written Opinion—PCT/US2013/060412—ISA/EPO—Jan. 8, 2014, Jan. 8, 2014, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Luo, et al., "High Level Syntax for MVC Hypothetical Reference Decoder and VUI," JVT Meeting; MPEG Meeting; Oct. 21, 2007-Oct. 26, 2007; Shenzhen, CN; (Joint Video Team of ISO/IEC JTC1/SC29/WG11 and ITU-T SG.16),, No. JVT-Y043, XP030007248, ISSN: 0000-0137, 10 pp.

Sjoberg, et al., "Overview of HEVC High-Level Syntax and Reference Picture Management," IEEE Transactions on Circuits and Systems for Video Technology, vol. 22 (12), Dec. 2012, pp. 1858-1870.

Sullivan, et al., "Video Compression—From Concepts to the H.264/AVC Standard" Proceedings of the IEEE, IEEE. New York, US

(56) References Cited

OTHER PUBLICATIONS

LNKD- DOI:10.1109/JPROC.2004.839617, vol. 93, No. 1, Jan. 1, 2005, pp. 18-31, XP011123850 ISSN: 0018-9219.
Wang: "AHG9: On HRD and related general issues", JCT-VC Meeting; MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/ No. JCTVC-K0126, XP030113008, 7 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand et al., "WD1: Working Draft 1 of High-Efficiency Video Coding", JCTVC-C403, 3rd Meeting: Guangzhou, CN, Oct. 7-15, 2010, 137 pp.
Wang "Report of BoG on high-level syntax for extension planning," JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,, No. JCTVC-J0574, XP030112936, 17 pp.
Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Document No. JCTVC-K1003_v13, Oct. 10-19, 2012, 317 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Response to Written Opinion dated Jan. 8, 2014, from International Application No. PCT/US2013/060412, filed on Apr. 8, 2014, 27 pp.

Second Written Opinion from International Application No. PCT/US2013/060412, dated Sep. 26, 2014, 8 pp.
Response to Written Opinion dated Sep. 26, 2014, from International Application No. PCT/US2013/060412, filed Nov. 25, 2014, 17 pp.
International Preliminary Report and Patentability from International Application No. PCT/US2013/060412, dated Jan. 29, 2015, 12 pp.
ITU-T H.265, Series H: Audiovisual and Multimedia Systems, Infrastructure of audiovisual services—Coding of moving video, High efficiency video coding, The International Telecommunication Union, Apr. 2015, 634 pp.
Flynn, et al., "High Efficiency Video Coding (HEVC) Range Extensions Text Specification: Draft 7," (JCTVC-Q1005_v9), JCT-VC of ITU-T SG 16 WP 3 and ISO/IEC JTC 1/SC 29/WG 11, 17th Meeting: Valencia, ES.; Mar. 27-Apr. 4, 2014; 352 pp. [uploaded in parts].
Wang, "AHG9: Signalling of Regions of Interest and Gradual Decoding Refresh," (JCTVC-K0128), Oct. 10-19, 2012; JCT-VC of ITU-T SG 16 WP 3 and ISO/IEC JTC 1/SC 29/WG 11, 11th Meeting: Shanghai, CN, Oct. 1, 2012; 4 pp.
Bross, et al., "Proposed Editorial Improvements for High efficiency video coding (HEVC) Text Specification Draft 8", JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-K0030, Sep. 12, 2012, 277 pp.
Wang, "Spec Text Changes for JCTVC-K0126 based on JCTVC-K0030v2", JCTVC-K0126 (version 1), Oct. 10-19, 2012; Joint Collaborative Team on Video Coding (JCT-VC) of ITU-T SG 16 WP 3 and ISO/IEC JTC 1/SC 29/WG 11, Oct. 1 2012, 15 pp.
Wang "BoG on high-level syntax for extension planning", JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL:http://phenix.int/evry.fr/jct2/, No. JCT3V-A0177, Jul. 20, 2012, XP030130176, 17 pp.

* cited by examiner

HYPOTHETICAL REFERENCE DECODER PARAMETERS IN VIDEO CODING

This application claims the benefit of U.S. Provisional Patent Application No. 61/705,102, filed Sep. 24, 2012, the entire content of which is incorporated herein by reference.

TECHNICAL FIELD

This disclosure relates to video encoding and decoding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, 3D video bitstream may contain not only texture view components, but also depth view components. For example, each view may comprise one texture view component and one depth view component.

SUMMARY

In general, this disclosure describes signaling and selection of hypothetical reference decoder (HRD) parameters in video coding. More specifically, a computing device may select, from among a set of hypothetical reference decoder (HRD) parameters in a video parameter set (VPS) and a set of HRD parameters in a sequence parameter set (SPS), a set of HRD parameters applicable to a particular operation point of a bitstream. The computing device performs, based at least in part on the set of HRD parameters applicable to the particular operation point, an HRD operation on a bitstream subset associated with the particular operation point.

In one example, this disclosure describes a method of processing video data. The method comprises selecting, from among a set of HRD parameters in a VPS and a set of HRD parameters in a SPS, a set of HRD parameters applicable to a particular operation point of a bitstream. The method also comprises performing, based at least in part on the selected set of HRD parameters applicable to the particular operation point, an HRD operation on a bitstream subset associated with the particular operation point.

In another example, this disclosure describes a device comprising one or more processors configured to select, from among a set of HRD parameters in a VPS and a set of HRD parameters in a SPS, a set of HRD parameters applicable to a particular operation point of a bitstream. The one or more processors are also configured to perform, based at least in part on the selected set of HRD parameters applicable to the particular operation point, an HRD operation on a bitstream subset associated with the particular operation point.

In another example, this disclosure describes a device comprising means for selecting, from among a set of HRD parameters in a VPS and a set of HRD parameters in a SPS, a set of HRD parameters applicable to a particular operation point of a bitstream. The device also comprises means for performing, based at least in part on the selected set of HRD parameters applicable to the particular operation point, an HRD operation on a bitstream subset associated with the particular operation point.

In another example, this disclosure describes a computer-readable data storage medium having instructions stored thereon that, when executed by one or more processors of a device, configure the device to select, from among a set of HRD parameters in a VPS and a set of HRD parameters in a SPS, a set of HRD parameters applicable to a particular operation point of a bitstream. In addition, the instructions, when executed, configure the device to perform, based at least in part on the selected set of HRD parameters applicable to the particular operation point, an HRD operation on a bitstream subset associated with the particular operation point.

The details of one or more examples of the disclosure are set forth in the accompanying drawings and the description below. Other features, objects, and advantages will be apparent from the description, drawings, and claims.

DETAILED DESCRIPTION

Figure 1:
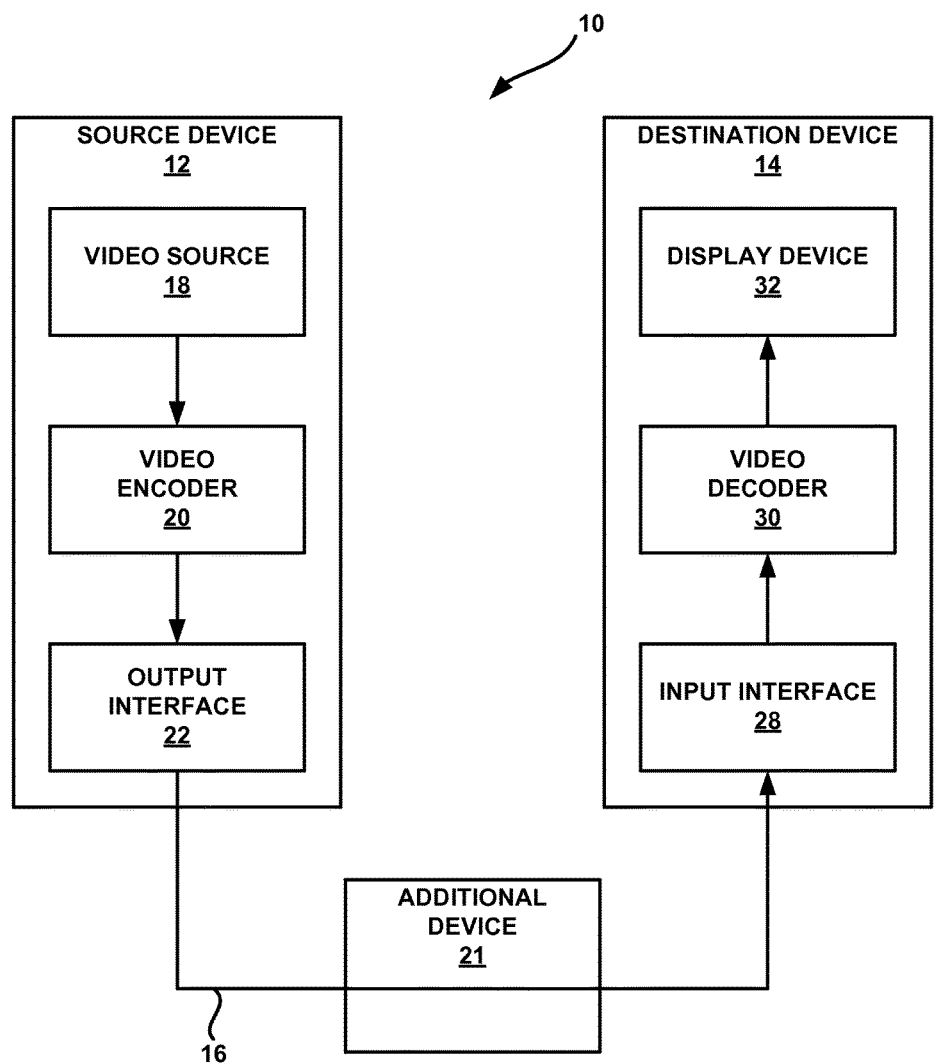
FIG. 1 is a block diagram illustrating an example video coding system that may utilize the techniques described in this disclosure.

A video encoder may generate a bitstream that includes encoded video data. The bitstream may comprise a series of network abstraction layer (NAL) units. The NAL units of the bitstream may include video coding layer (VCL) NAL units and non-VCL NAL units. The VCL NAL units may include coded slices of pictures. A non-VCL NAL unit may include a video parameter set (VPS), a sequence parameter set (SPS), a picture parameter set (PPS), supplemental enhancement information (SEI), or other types of data. A VPS is a syntax structure that may contain syntax elements that apply to zero or more entire coded video sequences. A SPS is a syntax structure that may contain syntax elements that apply to zero or more entire coded video sequences. A single VPS may be applicable to multiple SPS's. A PPS is a syntax structure that may contain syntax elements that apply to zero or more entire coded pictures. A single SPS may be applicable to multiple PPS's. Various aspects of the VPS, SPS and PPS may be formed, in general, as defined by the HEVC standard.

A device, such as a content delivery network (CDN) device, a Media-Aware Network Element (MANE), or a video decoder, may extract a sub-bitstream from the bitstream. The device may perform the sub-bitstream extraction process by removing certain NAL units from the bitstream. The resulting sub-bitstream includes the remaining, non-removed NAL units of the bitstream. As examples, video data decoded from the sub-bitstream may have a lower frame rate and/or may represent fewer views than the original bitstream.

Video coding standards may include various features to support the sub-bitstream extraction process. For example, video data of the bitstream may be divided into a set of layers. For each of the layers, data in a lower layer may be decoded without reference to data in any higher layer. An individual NAL unit only encapsulates data of a single layer. Thus, NAL units encapsulating data of the highest remaining layer of the bitstream may be removed from the bitstream without affecting the decodability of data in the remaining lower layers of the bitstream. In scalable video coding (SVC), higher layers may include enhancement data that improve the quality of pictures in lower layers (quality scalability), enlarge the spatial format of pictures in lower layers (spatial scalability), or increase the temporal rate of pictures in lower layers (temporal scalability). In multi-view coding (MVC) and three-dimensional video (3DV) coding, higher layers may include additional views.

NAL units may include headers and payloads. The headers of NAL units include nuh_reserved_zero_6bits syntax elements. The nuh_reserved_zero_6bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6bits syntax element may have a non-zero value. Specifically, if a NAL unit does not relate to a base layer in multi-view coding, 3DV, or SVC, the nuh_reserved_zero_6bits syntax element of the NAL unit specifies a layer identifier of the NAL unit.

Furthermore, some pictures within a layer may be decoded without reference to other pictures within the same layer. Thus, NAL units encapsulating data of certain pictures of a layer may be removed from the bitstream without affecting the decodability of other pictures in the layer. For example, pictures with even picture order count (POC) values may be decodable without reference to pictures with odd POC values. Removing NAL units encapsulating data of such pictures may reduce the frame rate of the bitstream. A subset of pictures within a layer that may be decoded without reference to other pictures within the layer may be referred to herein as a sub-layer.

NAL units may include temporal_id syntax elements. The temporal_id syntax element of a NAL unit specifies a temporal identifier of the NAL unit. If the temporal identifier of a first NAL unit is less than the temporal identifier of a second NAL unit, the data encapsulated by the first NAL unit may be decoded without reference to the data encapsulated by the second NAL unit.

Each operation point of a bitstream is associated with a set of layer identifiers (i.e., a set of nuh_reserved_zero_6bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset that is associated with an operation point. The operation point representation may include each NAL unit that is associated with the operation point. The operation point representation does not include VCL NAL units that are not associated with the operation point.

An external source may specify a set of target layer identifiers for an operation point. For example, a device, such as a CDN device or a MANE, may specify the set of target layer identifiers. In this example, the device may use the set of target layer identifiers to identify an operation point. The device may then extract the operation point representation for the operation point and forward the operation point representation, instead of the original bitstream, to a client device. Extracting and forwarding the operation point representation to the client device may reduce the bit rate of the bitstream.

Furthermore, video coding standards specify video buffering models. A video buffering model may also be referred to as a "hypothetical reference decoder" or an "HRD." The HRD describes how data is to be buffered for decoding and how decoded data is buffered for output. For instance, the HRD describes the operation of a coded picture buffer ("CPB") and a decoded picture buffer ("DPB") in a video decoder. The CPB is a first-in first-out buffer containing access units in decoding order specified by HRD. The DPB is a buffer holding decoded pictures for reference, output reordering, or output delay specified by the HRD.

A video encoder may signal a set of HRD parameters. The HRD parameters control various aspects of the HRD. The HRD parameters include an initial CPB removal delay, a CPB size, a bit rate, an initial DPB output delay, and a DPB size. These HRD parameters are coded in a hrd_parameters ( ) syntax structure specified in a VPS and/or a SPS. The HRD parameters can also be specified in a buffering period supplemental enhancement information (SEI) message or a picture timing SEI message.

As explained above, an operation point representation may have a different frame rate and/or bit rate than an original bitstream. This is because the operation point representation may not include some pictures and/or some of the data of the original bitstream. Hence, if the video decoder were to remove data from the CPB and/or the DPB at a particular rate when processing the original bitstream and if the video decoder were to remove data from the CPB and/or the DPB at the same rate when processing an operation point representation, the video decoder may remove too much or too little data from the CPB and/or the DPB. Accordingly, the video encoder may signal different sets of HRD parameters for different operation points. In the emerging High-Efficiency Video Coding (HEVC) standard, the video encoder may signal sets of HRD parameters in a VPS or the video encoder may signal sets of HRD parameters in a SPS. A draft of the upcoming HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012, which as of May 8, 2013, is available from http://phenix.int-evry.fr/jct/doc_end_user/documents/10_Stockholm/wg11/JCTVC-J1003-v8.zip.

In some versions of HEVC, only the sets of HRD parameters in the VPS are selected for HRD operations. That is, although HRD parameters can be provided in SPS's, the sets of HRD parameters in the SPS's are not selected by HEVC video decoders for HRD operations. Video decoders always parse and decode the VPS of a bitstream. Hence, video decoders always parse and decode the sets of HRD parameters of the VPS. This is true regardless of whether the bitstream includes non-base layer NAL units. Hence, if the bitstream includes non-base layer NAL units, it may be a waste of computational resources to parse and handle the sets of HRD parameters in the SPS's. Furthermore, if the sets of HRD parameters are present in the VPS, the sets of HRD parameters in the SPS's may be wasted bits.

In accordance with the techniques of this disclosure, a video encoder may generate a bitstream that includes a SPS that is applicable to a sequence of pictures. The SPS includes a set of HRD parameters. The set of HRD parameters is applicable to each operation point of the bitstream that has a set of layer identifiers that match a set of target layer identifiers. Thus, the sets of HRD parameters in the SPS's are not wasted, but rather may be used for HRD operations. For instance, a device may select, from among a set of HRD parameters in a VPS and a set of HRD parameters in a SPS, a set of HRD parameters applicable to a particular operation point. The device may perform, based at least in part on the set of HRD parameters applicable to the particular operation point, a bitstream conformance test that tests whether a bitstream subset associated with the particular operation point conforms to a video coding standard.

A device, such as a video encoder, a video decoder, or another type of device, such as a CDN device or MANE, may perform a bitstream conformance test on an operation point representation for an operation point. The bitstream conformance test may verify that the operation point representation conforms to a video coding standard, such as HEVC. As mentioned above, a set of target layer identifiers and a temporal identifier may be used to identify the operation point. The set of target layer identifiers may be denoted as "TargetDecLayerIdSet." The temporal identifier may be denoted as "TargetDecHighestTid." Problematically, HEVC Working Draft 8 does not specify how TargetDecLayerIdSet or TargetDecHighestTid are set when performing a bitstream conformance test.

In accordance with one or more techniques of this disclosure, a device may perform a decoding process as part of performing a bitstream conformance test. Performing the decoding process comprises performing a bitstream extraction process to decode, from a bitstream, an operation point representation of an operation point defined by a target set of layer identifiers and a target highest temporal identifier. The target set of layer identifiers (i.e., TargetDecLayerIdSet) contains values of layer identifier syntax elements (e.g., nuh_reserved_zero_6bits syntax elements) present in the operation point representation. The target set of layer identifiers is a subset of values of layer identifier syntax elements of the bitstream. The target highest temporal identifier (i.e., TargetDecHighestTid) is equal to a greatest temporal identifier present in the operation point representation. The target highest temporal identifier is less than or equal to a greatest temporal identifier present in the bitstream. Performing the decoding process may also comprise decoding NAL units of the operation point representation.

In HEVC, a SPS may include an array of syntax elements denoted as sps_max_dec_pic_buffering[i], where i ranges from 0 to the maximum number of temporal layers in the bitstream. sps_max_dec_pic_buffering[i] indicates the maximum required size of the DPB when a highest temporal identifier (HighestTid) is equal to i. sps_max_dec_pic_buffering[i] indicates the required size in terms of units of picture storage buffers.

Furthermore, in HEVC, a SPS may include an array of syntax elements denoted sps_max_num_reorder_pics[i], where i ranges from 0 to the maximum number of temporal layers in the bitstream. sps_max_num_reorder_pics[i] indicates a maximum allowed number of pictures preceding any picture in decoding order and succeeding that picture in output order when a highest temporal identifier (HighestTid) is equal to i.

In HEVC, a set of HRD parameters may include an array of syntax elements denoted cpb_cnt_minus1[i], where i ranges from 0 to the maximum number of temporal layers in the bitstream. cpb_cnt_minus1[i] specifies the number of alternative CPB specifications in the bitstream of the coded video sequence when a highest temporal identifier (HighestTid) is equal to i, wherein one alternative CPB specification refers to one particular CPB operation with a particular set of CPB parameters.

In HEVC Working Draft 8, sps_max_dec_pic_buffering [i], sps_max_num_reorder_pics[i], and cpb_cnt_minus1[i] are not properly selected in HRD operations, bitstream conformance operations, and level restrictions. This is at least in part because HEVC Working Draft 8 does not specify what is meant by the highest temporal identifier (HighestTid).

In accordance with one or more techniques of this disclosure, a device, such as a video encoder, a video decoder, or another device, may determine a highest temporal identifier of a bitstream-subset associated with a selected operation point of a bitstream. Furthermore, the device may determine, based on the highest temporal identifier, a particular syntax element from among an array of syntax elements (e.g., sps_max_dec_pic_buffering[ ], sps_max_num_reorder_pics[ ], or cpb_cnt_minus1[ ]). The device may perform an operation that uses the particular syntax element to determine conformance of the bitstream to a video coding standard or to determine conformance of a video decoder to the video coding standard.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. In the example of FIG. 1, channel 16 includes an additional device 21. In some examples, additional device 21 is a CDN device, a MANE, or another type of device.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30 or additional device 21. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and/or MVC-based 3DV extension. In some instances, any bitstream conforming to MVC-based 3DV always contains a sub-bitstream that is compliant to a MVC profile, e.g., stereo high profile. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In other examples, video encoder 20 and video decoder 30 may operate according to the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11$^{th}$ Meeting, Shanghai, China, October 2012, which as of May 8, 2013, is available from http://phenix.int-evry.fr/jct/doc_end_user/documents/11_Shanghai/wg11/JCTVC-K1003-v13.zip. Furthermore, there are ongoing efforts to produce SVC, multi-view coding, and 3DV extensions for HEVC. The 3DV extension of HEVC may be referred to as HEVC-based 3DV or 3D-HEVC.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition coding blocks of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses bi-prediction to generate the predictive blocks for a PU, the PU may have two motion vectors.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. A NAL unit may be a syntax structure containing an indication of the type of data to follow and bytes containing that data in the form of a raw byte sequence payload (RBSP) interspersed as necessary with emulation prevention bytes. That is, each of the NAL units may include a NAL unit header and encapsulate a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multi-view coding supports inter-view prediction. Inter-view prediction is similar to the inter prediction used in H.264/AVC and HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e. access unit) as the picture that the video coder is currently coding. Like other inter prediction reference pictures, the video coder may insert an inter-view prediction reference picture at any position of a reference picture list.

Video coding standards specify video buffering models. In H.264/AVC and HEVC, a buffering model is referred to as a "hypothetical reference decoder" or "HRD." In HEVC Working Draft 8, the HRD is described in Annex C.

The HRD describes how data is to be buffered for decoding and how decoded data is buffered for output. For instance, the HRD describes the operation of a coded picture buffer ("CPB"), a decoded picture buffer ("DPB"), and a video decoder. The CPB is a first-in first-out buffer containing access units in a decoding order specified by HRD. The DPB is a buffer holding decoded pictures for reference, output reordering, or output delay specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics.

In H.264/AVC and HEVC, bitstream conformance and decoder conformance are specified as parts of the HRD specification. In other words, the HRD model specifies tests to determine whether a bitstream conforms to a standard and tests to determine whether a decoder conforms to the standard. Though the HRD is named some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8bits, zero_byte, start_coded_prefix_one_3 bytes, and trailing_zero_8bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule.

Furthermore, the device may invoke a decoding process that decodes the coded video data in the CPB. The decoding process may output decoded pictures to the DPB. As the device moves data through the HRD, the device may determine whether a particular set of constraints remain satisfied. For example, the device may determine whether an overflow or underflow condition occurs in the CPB or DPB while the HRD is decoding the operation point representation of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC. In this disclosure, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values. Alternatively, they may take the form of constraints on arithmetic combinations of values (e.g., picture width multiplied by picture height multiplied by number of pictures decoded per second). A level specified for a lower tier is more constrained than a level specified for a higher tier.

When a device performs a decoder conformance test to determine whether a decoder under test (DUT) conforms to a video coding standard, the device may provide to both the HRD and the DUT a bitstream that conforms to the video coding standard. The HRD may process the bitstream in the manner described above with regard to the bitstream conformance test. The device may determine that the DUT conforms to the video coding standard if the order of decoded pictures output by the DUT matches the order of decoded pictures output by the HRD. Moreover, the device may determine that the DUT conforms to the video coding standard if the timing with which the DUT outputs decoded pictures matches the timing with which the HRD outputs the decoded pictures.

In addition to bitstream conformance tests and decoder conformance tests, devices may use HRD parameters for other purposes. For examples, the initial CPB removal delays may be used to guide a system to set up an appropriate initial end-to-end delay and the DPB output times may be used to derive real-time protocol (RTP) timestamps when the video data bitstream is transported over RTP.

In the H.264/AVC and HEVC HRD models, decoding or CPB removal may be access unit based. That is, the HRD is assumed to decode complete access units at one time and remove complete access units from the CPB. Furthermore, in the H.264/AVC and HEVC HRD models, it is assumed that picture decoding is instantaneous. Video encoder 20 may signal, in picture timing SEI messages, decoding times to start decoding of access units. In practical applications, if a conforming video decoder strictly follows the decoding times signaled to start decoding of access units, the earliest possible time to output a particular decoded picture is equal to the decoding time of that particular picture plus the time needed for decoding that particular picture. However, in the real-world, the time needed for decoding a picture cannot be equal to zero.

HRD parameters may control various aspects of the HRD. In other words, the HRD may rely on the HRD parameters. The HRD parameters may include an initial CPB removal delay, a CPB size, a bit rate, an initial DPB output delay, and a DPB size. Video encoder 20 may signal these HRD parameters in a hrd_parameters( ) syntax structure specified in a video parameter set (VPS) and/or a sequence parameter set (SPS). Individual VPS's and/or SPS's may include multiple hrd_parameters( ) syntax structures for different sets of HRD parameters. In some examples, video encoder 20 may signal HRD parameters in buffering period SEI messages or picture timing SEI messages.

As explained above, an operation point of a bitstream is associated with a set of layer identifiers (i.e., a set of nuh_reserved_zero_6bits values) and a temporal identifier. An operation point representation may include each NAL unit that is associated with the operation point. An operation point representation may have a different frame rate and/or bit rate than an original bitstream. This is because the operation point representation may not include some pictures and/or some of the data of the original bitstream. Hence, if video decoder 30 were to remove data from the CPB and/or the DPB at a particular rate when processing the original bitstream and if video decoder 30 were to remove data from the CPB and/or the DPB at the same rate when processing an operation point representation, video decoder 30 may remove too much or too little data from the CPB and/or the DPB. Accordingly, video encoder 20 may signal different sets of HRD parameters for different operation points. For instance, video encoder 20 may include, in a VPS, multiple hrd_parameters( ) syntax structures that include HRD parameters for different operation points.

In HEVC Working Draft 8, the set of HRD parameters optionally includes a set of information that is common for all sub-layers. In other words, the set of HRD parameters may optionally include a set of common syntax elements that are applicable to operation points that include any temporal sub-layers. A temporal sub-layer is a temporal scalable layer of a temporal scalable bitstream consisting of VCL NAL units with a particular value of TemporalId and the associated non-VCL NAL units. In addition to the set of common information, the sets of HRD parameters may include a set of syntax elements that are specific to individual temporal sub-layers. For instance, the hrd_parameters( ) syntax structure may optionally include a set of information that is common for all sub-layers and always includes sub-layer-specific information. Because the set of common information is common to multiple sets of HRD parameters, it may be unnecessary to signal the set of common information in multiple sets of HRD parameters. Rather, in HEVC Working Draft 8, the common information may be present in a set of HRD parameters when the set of HRD parameters is the first set of HRD parameters in a VPS or the common information may be present in a set of HRD parameters when the set of HRD parameters is associated with the first operation point index. For instance, HEVC Working Draft 8 supports the presence of common information when either the hrd_parameters( ) syntax structure is the first hrd_parameters( ) syntax structure in the VPS or when the hrd_parameters( ) syntax structure is associated with a first operation point.

Table 1, below, is an example syntax structure for a hrd_parameters( ) syntax structure in HEVC.

TABLE 1

| HRD Parameters | |
|---|---|
| hrd_parameters( commonInfPresentFlag, MaxNumSubLayersMinus1 ) { | Descriptor |
| if( commonInfPresentFlag ) { | |
|     timing_info_present_flag | u(1) |
|     if( timing_info_present_flag ) { | |
|         num_units_in_tick | u(32) |
|         time_scale | u(32) |
|     } | |
|     nal_hrd_parameters_present_flag | u(1) |
|     vcl_hrd_parameters_present_flag | u(1) |
|     if( nal_hrd_parameters_present_flag \|\| vcl_hrd_parameters_present_flag ){ | |
|         sub_pic_cpb_params_present_flag | u(1) |
|         if( sub_pic_cpb_params_present_flag ) { | |
|             tick_divisor_minus2 | u(8) |
|             du_cpb_removal_delay_length_minus1 | u(5) |
|         } | |
|         bit_rate_scale | u(4) |
|         cpb_size_scale | u(4) |

TABLE 1-continued

| HRD Parameters | |
|---|---|
| hrd_parameters( commonInfPresentFlag, MaxNumSubLayersMinus1 ) { | Descriptor |
|         initial_cpb_removal_delay_length_minus1 | u(5) |
|         cpb_removal_delay_length_minus1 | u(5) |
|         dpb_output_delay_length_minus1 | u(5) |
|     } | |
| } | |
| for( i = 0; i <= MaxNumSubLayersMinus1; i++ ) { | |
|     fixed_pic_rate_flag[ i ] | u(1) |
|     if( fixed_pic_rate_flag[ i ] ) | |
|         pic_duration_in_tc_minus1[ i ] | ue(v) |
|     low_delay_hrd_flag[ i ] | u(1) |
|     cpb_cnt_minus1[ i ] | ue(v) |
|     if( nal_hrd_parameters_present_flag ) | |
|         sub_layer_hrd_parameters( i ) | |
|     if( vcl_hrd_parameters_present_flag ) | |
|         sub_layer_hrd_parameters( i ) | |
| } | |
| } | |

In the example of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n.

In the example syntax of Table 1, the syntax elements in the "if (commonInfPresentFlag) { . . . }" block are the common information of the HRD parameter sets. In other words, the common information of set of HRD parameters may include the syntax elements timing_info_present_flag, num_units_in_tick, time_scale, nal_hrd_parameters_present_flag, vcl_hrd_parameters_present_flag, sub_pic_cpb_params_present_flag, tick_divisor_minus2, du_cpb_removal_delay_length_minus1, bit_rate_scale, cpb_size_scale, initial_cpb_removal_delay_length_minus1, cpb_removal_delay_length_minus1, and dpb_output_delay_length_minus1.

Furthermore, in the example of Table 1, the syntax elements fixed_pic_rate_flag[i], pic_duration_in_tc_minus1[i], low_delay_hrd_flag[i], and cpb_cnt_minus1[i] may be a set of sub-layer-specific HRD parameters. In other words, these syntax element of the hrd_parameters( ) syntax structure may only be applicable to operation points that include a specific sub-layer. Thus, the HRD parameters of a hrd_parameters( ) syntax structure may include, in addition to the optionally-included common information, a set of sub-layer-specific HRD parameters that is specific to a particular sub-layer of the bitstream.

The fixed_pic_rate_flag[i] syntax element may indicate that, when HighestTid is equal to i, the temporal distance between the HRD output times of any two consecutive pictures in output order is constrained in a specific way. HighestTid may be a variable that identifies a highest temporal sub-layer (e.g., of an operation point). The pic_duration_in_tc_minus1[i] syntax element may specify, when HighestTid is equal to i, the temporal distance, in clock ticks, between the HRD output times of any consecutive pictures in output order in the coded video sequence. The low_delay_hrd_flag[i] syntax element may specify the HRD operation mode, when HighestTid is equal to i, as specified in Annex C of HEVC Working Draft 8. The cpb_cnt_minus1[i] syntax element may specify the number of alternative CPB specifications in the bitstream of the coded video sequence when HighestTid is equal to i.

Video encoder 20 may use SEI messages to include, in the bitstream, metadata that is not required for correct decoding of the sample values of pictures. However, video decoder 30 or other devices may use the metadata included in SEI messages for various other purposes. For example, video decoder 30 may use the metadata in SEI messages for picture output timing, picture displaying, loss detection, and error concealment.

Video encoder 20 may include one or more SEI NAL units in an access unit. In other words, any number of SEI NAL units may be associated with an access unit. Furthermore, each SEI NAL unit may contain one or more SEI messages. The HEVC standard describes the syntax and semantics for various types of SEI messages. However, the HEVC standard does not describe the handling of the SEI messages because the SEI messages do not affect the normative decoding process. One reason to have SEI messages in the HEVC standard is to enable supplemental data being interpreted identically in different systems using HEVC. Specifications and systems using HEVC may require video encoders to generate certain SEI messages or may define specific handling of particular types of received SEI messages. Table 2, below, lists SEI messages specified in HEVC and briefly describes their purposes.

HEVC Working Draft 8, only the sets of HRD parameters in the VPS are selected for HRD operations. That is, although HRD parameters can be provided in SPS's, the sets of HRD parameters in SPS's are not selected by HEVC video decoders for HRD operations. Video decoders always parse and decode the VPS of a bitstream. Hence, video decoders always parse and decode the sets of HRD parameters of the VPS.

This is true regardless of whether the bitstream includes non-base layer NAL units. For instance, only the hrd_parameters( ) syntax structure coded in the VPS may be selected for HRD operations, and the possibly-present hrd_parameters( ) syntax structure in the SPS may never be selected. This may require the parsing and handling of the VPS, even when decoding a bitstream that does not contain nuh_reserved_zero_6bits greater than 0 (i.e., the bitstream contains only the base layer in a multiview, 3DV, or SVC extension of HEVC).

Thus, if the bitstream includes non-base layer NAL units, it may be a waste of computational resources to parse and handle the sets of HRD parameters in the SPS's. Furthermore, if the sets of HRD parameters are present in the VPS, the sets of HRD parameters in the SPS's may be wasted bits.

TABLE 2

Overview of SEI messages

| SEI message | Purpose |
| --- | --- |
| Buffering period | Initial delays for hypothetical reference decoder (HRD) operation |
| Picture timing | Picture output time and picture/sub-picture removal time for HRD operation |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Field indication | Provides information related to interlaced video content and/or field coding, e.g. indicates whether the picture is a progressive frame, a field, or a frame containing two interleaved fields |
| Decoded picture hash | Checksum of the decoded picture, which may be used for error detection |
| Sub-picture timing | Sub-picture removal time for HRD operation |
| Active parameter sets | Provides information on active VPS, SPS, etc. |
| Structure of Pictures description | Describes the temporal and inter prediction structure of the bitstream |

There are several problems or shortcomings with existing techniques for signaling HRD parameters and selection of HRD parameters and other parameters. For example, in For instance, if an hrd_parameters( ) syntax structure is present in the SPS, the coded bits for the syntax structure may be purely a waste of bits.

In accordance with one or more techniques of this disclosure, video encoder 20 may generate a bitstream that includes an SPS that is applicable to a sequence of pictures. The SPS includes a set of HRD parameters. The set of HRD parameters is applicable to each operation point of the bitstream that has a set of layer identifiers that matches a set of target layer identifiers. Thus, the sets of HRD parameters in the SPS's are not wasted, but rather may be used for HRD operations. For instance, the operation points to which the hrd_parameters( ) syntax structure coded in a SPS pertains may be clearly specified, e.g. to be the operation points for which only one value of nuh_reserved_zero_6bits (i.e., layer ID in a multiview, 3DV or scalable video coding extension) is present in the bitstream.

For example, a device, such as video encoder 20 or video decoder 30, may select, from among a set of HRD parameters in a video parameter set and a set of HRD parameters in a SPS, a set of HRD parameters applicable to a particular operation point. In this example, the device may perform, based at least in part on the set of HRD parameters applicable to the particular operation point, a bitstream conformance test that tests whether a bitstream subset associated with the particular operation point conforms to a video coding standard. The bitstream conformance test may verify that the operation point representation conforms to a video coding standard, such as HEVC.

In this disclosure, an operation point may be identified by a set of nuh_reserved_zero_6bits values, denoted as OpLayerIdSet, and a TemporalId value, denoted as OpTid. The associated bitstream subset derived as the output of the sub-bitstream extraction process as specified in subclause 10.1 of HEVC Working Draft 8 with OpTid and OpLayerIdSet as inputs is independently decodable. Subclause 10.1 of HEVC Working Draft 8 describes an operation for extracting a sub-bitstream (i.e., an operation point representation) from the bitstream. Specifically, subclause 10.1 of HEVC Working Draft 8 provides that the sub-bitstream is derived by removing from the bitstream all NAL units with temporal identifiers (e.g., TemporalID) greater than tIdTarget or layer identifiers (e.g., nuh_reserved_zero_6bits) not among the values in targetDecLayerIdSet. tIdTarget and targetDecLayerIdSet are parameters of the bitstream extraction process.

In another example problem or shortcoming with the existing techniques for signaling HRD parameters, a device, such as a video encoder, a video decoder, or another type of device, may perform a bitstream conformance test on an operation point representation for an operation point. As mentioned above, a set of target layer identifiers and a temporal identifier may be used to identify the operation point. The set of target layer identifiers may be denoted as "TargetDecLayerIdSet." The temporal identifier may be denoted as "TargetDecHighestTid." Problematically, HEVC Working Draft 8 does not specify how TargetDecLayerIdSet or TargetDecHighestTid are set when performing a bitstream conformance test. For instance, when the decoding process is invoked for a bitstream conformance test, the semantics of syntax elements are not clearly specified as the values of TargetDecLayerIdSet and TargetDecHighestTid are not properly set.

One or more techniques of this disclosure indicate how TargetDecLayerIdSet and TargetDecHighestTid are set when performing a bitstream conformance test. For instance, the general decoding process for a bitstream (or operation point representation) is modified such that if the bitstream (or operation point representation) is decoded in a bitstream conformance test, TargetDecLayerIdSet is set as specified in subclause C.1 of the HEVC standard. Similarly, the general decoding process for a bitstream (or operation point representation) may be modified such that if the bitstream (or operation point representation) is decoded in a bitstream conformance test, TargetDecHighestTid is set as specified in subclause C.1 of HEVC Working Draft 8. In other words, the device may determine a target layer identifier set of the particular operation point that contains each layer identifier present in the bitstream subset and the layer identifier set of the particular operation point is a subset of layer identifiers present in the bitstream. In addition, the device may determine a target temporal identifier of the particular operation point that is equal to a greatest temporal identifier present in the bitstream subset and the target temporal identifier of the particular operation point is less than or equal to the greatest temporal identifier present in the bitstream.

In subclause C.1 of HEVC Working Draft 8, TargetDecLayerIdSet is set to targetOpLayerIdSet. targetOpLayerIdSet contains the set of values for nuh_reserved_zero_6bits present in the operation point representation of the operation point under test. targetOpLayerIdSet is a subset of the values for nuh_reserved_zero_6bits present in the bitstream under test.

Furthermore, the variable TargetDecHighestTid identifies the highest temporal sub-layer to be decoded. A temporal sub-layer is a temporal scalable layer of a temporal scalable bitstream consisting of VCL NAL units with a particular value of TemporalId and the associated non-VCL NAL units. In subclause C.1 of the HEVC standard, TargetDecHighestTid is set to targetOpTid. targetOpTid is equal to the greatest temporal_id present in the operation point representation of the operation point under test and is less than or equal to the greatest temporal_id present in the bitstream under test. Thus, when the decoding process is invoked for a bitstream conformance test, the values of TargetDecLayerIdSet and TargetDecHighestTid are set to the set of nuh_reserved_zero_6bits values and the greatest TemporalId value present in the sub-bitstream corresponding to the operation point under test for the specific bitstream conformance test.

In this way, a device (such as video encoder 20, video decoder 30, additional device 21, or another device) may, in accordance with one or more techniques of this disclosure, perform a decoding process as part of performing a bitstream conformance test. Performing the decoding process may comprise performing a bitstream extraction process to extract, from a bitstream, an operation point representation of an operation point defined by a target set of layer identifiers and a target highest temporal identifier. The target set of layer identifiers (i.e., TargetDecLayerIdSet) contains values of layer identifier syntax elements (e.g., nuh_reserved_zero_6bits syntax elements) present in the operation point representation. The target set of layer identifiers is a subset of values of layer identifier syntax elements of the bitstream. The target highest temporal identifier (i.e., TargetDecHighestTid) is equal to a greatest temporal identifier present in the operation point representation. The target highest temporal identifier is less than or equal to a greatest temporal identifier present in the bitstream. Performing the decoding process also comprises decoding NAL units of the operation point representation.

The decoding process is not always performed as part of performing a bitstream conformance test. Rather, the decoding process may be a general process for decoding a bitstream. When the decoding process is not performed as part of a bitstream conformance test, an external source may specify TargetDecLayerIdSet and TargetDecHighestTid for an operation point. The external source may be any source of information outside the bitstream. For example, a CDN device may programmatically determine and specify TargetDecLayerIdSet and TargetDecHighestTid based on the configuration of a particular video decoder. The device performing the decoding process may use the externally-specified TargetDecLayerIdSet and TargetDecHighestTid to extract the operation point representation from the bitstream. The device performing the decoding process may then decode NAL units of the extracted operation point representation.

Thus, when the decoding process is not performed as part of the bitstream conformance test, the device performing the decoding process may receive, from an external source, a target set of layer identifiers and a target highest temporal identifier. The target set of layer identifiers contains values of layer identifier syntax elements present in an operation point representation. The target highest temporal identifier is equal to a greatest temporal identifier present in the second operation point representation. Furthermore, the device performing the decoding process may perform the bitstream extraction process to extract, from the bitstream, the operation point representation. The device performing the decoding process may then decode NAL units of the operation point representation.

In other instances, an external source does not specify TargetDecLayerIdSet or TargetDecHighestTid. In such instances, the decoding process may be performed on the whole bitstream. For example, the device may perform the bitstream extraction process to extract, from the bitstream, an operation point representation. In this example, 0 is the only value of layer identifier syntax elements (i.e., nuh_reserved_zero_6bits) present in the operation point representation. Furthermore, in this example, the greatest temporal identifier present in the bitstream is equal to a greatest temporal identifier present in the operation point representation. In this example, the device performing the decoding process may decode NAL units of the operation point representation.

As indicated above, a SPS may include an array of syntax elements denoted as sps_max_dec_pic_buffering[i], where i ranges from 0 to the maximum number of temporal layers in the bitstream. sps_max_dec_pic_buffering[i] indicates the maximum required size of the DPB when a highest temporal identifier (HighestTid) is equal to i. sps_max_dec_pic_buffering[i] indicates the required size in terms of units of picture storage buffers. Furthermore, a SPS may include an array of syntax elements denoted by sps_max_num_reorder_pics[i], where i ranges from 0 to the maximum number of temporal layers in the bitstream. sps_max_num_reorder_pics[i] indicates a maximum allowed number of pictures preceding any picture in decoding order and succeeding that picture in output order when a highest temporal identifier (HighestTid) is equal to i. In addition, a set of HRD parameters may include an array of syntax elements denoted cpb_cnt_minus1[i], where i ranges from 0 to the maximum number of temporal layers in the bitstream. cpb_cnt_minus1[i] specifies the number of alternative CPB specifications in the bitstream of the coded video sequence when a highest temporal identifier (HighestTid) is equal to i.

Because HEVC Working Draft 8 does not specify what is meant by the highest temporal identifier (HighestTid), HEVC Working Draft 8, sps_max_dec_pic_buffering[i], sps_max_num_reorder_pics[i], and cpb_cnt_minus1[i] are not properly selected in HRD operations, bitstream conformance operations, and level restrictions. In other words, the parameters sps_max_num_reorder_pics[i], sps_max_dec_pic_buffering[i], and cpb_cnt_minus1[i] in the HRD operations, bitstream conformance requirements and level restrictions are not properly selected.

In accordance with one or more techniques of this disclosure, sps_max_dec_pic_buffering[i] is defined such that sps_max_dec_pic_buffering[i] indicates the maximum required size of the DPB when TargetDecHighestTid is equal to i. TargetDecHighestTid is determined in the manner described above. This may stand in contrast to HEVC Working Draft 8, where HighestTid is not defined. The value of sps_max_dec_pic_buffering[i] shall be in the range of 0 to MaxDpbSize (as specified in subclause A.4 of HEVC Working Draft 8), inclusive. When i is greater than 0, sps_max_dec_pic_buffering[i] shall be equal to or greater than sps_max_dec_pic_buffering[i−1]. The value of sps_max_dec_pic_buffering[i] shall be less than or equal to vps_max_dec_pic_buffering[i] for each value of i.

Similarly, in accordance with one or more techniques of this disclosure, sps_max_num_reorder_pics[i] is defined such that sps_max_num_reorder_pics[i] indicates the maximum allowed number of pictures preceding any picture in decoding order and succeeding that picture in output order when TargetDecHighestTid is equal to i. TargetDecHighestTid is determined in the manner described above. The value of sps_max_num_reorder_pics[i] shall be in the range of 0 to sps_max_dec_pic_buffering[i], inclusive. When i is greater than 0, sps_max_num_reorder_pics[i] shall be equal to or greater than sps_max_num_reorder_pics[i−1]. The value of sps_max_num_reorder_pics[i] shall be less than or equal to vps_max_num_reorder_pics[i] for each value of i.

Furthermore, in accordance with one or more techniques of this disclosure, cpb_cnt_minus1[i] may specify the number of alternative CPB specifications in the bitstream of the coded video sequence when TargetDecHighestTid is equal to i, where i ranges from 0 to the maximum number of temporal layers in the bitstream. TargetDecHighestTid is determined in the manner described above. The value of cpb_cnt_minus1[i] is in the range of 0 to 31, inclusive. When low_delay_hrd_flag[i] is equal to 1, cpb_cnt_minus1[i] is equal to 0. When cpb_cnt_minus1[i] is not present, cpb_cnt_minus1[i] is inferred to be equal to 0.

Thus, in accordance with one or more techniques of this disclosure, a device may determine, based on a highest temporal identifier, a particular syntax element from among an array of syntax elements. The highest temporal identifier is defined such that the highest temporal identifier always identifies a highest temporal layer to be decoded. Thus, sps_max_num_reorder_pics[i], sps_max_dec_pic_buffering[i], and cpb_cnt_minus1[i] in the HRD operations, bitstream conformance requirements and level restrictions are consistently selected with i equal to the clearly specified value of TargetDecHighestTid.

In this way, a device (such a video encoder 20, video decoder 30, additional device 21, or another device) may perform a HRD operation to determine conformance of a bitstream to a video coding standard or to determine conformance of a video decoder to the video coding standard. As part of performing the HRD operation, the device may determine a highest temporal identifier of a bitstream-subset associated with a selected operation point of the bitstream. In addition, the device may determine, based on the highest temporal identifier, a particular syntax element from among an array of syntax elements (e.g., sps_max_num_reorder_pics[i], sps_max_dec_pic_buffering[i], or cpb_cnt_minus1[i]). Furthermore, the device may use the particular syntax element in the HRD operation.

Furthermore, in HEVC Working Draft 8, each of the hrd_parameters( ) syntax structures in the VPS may be associated with an operation_point_layer_ids( ) syntax structure based on which a hrd_parameters( ) syntax structure is selected for use in the HRD operations. Corresponding to each selected hrd_parameters( ) syntax structure, a set of buffering period SEI messages and picture timing SEI messages may also be needed in the HRD operations. However, there is no way to associate a buffering period SEI message or picture timing SEI message to a hrd_parameters ( ) syntax structure for which the associated operation_point_ layer_ids( ) syntax structure includes multiple values of nuh_reserved_zero_6bits (i.e., multiple layer IDs in a multiview, 3DV or scalable video coding extension of HEVC).

A solution to this problem may be to apply the multi-view coding scalable nesting SEI message as specified in Annex H of H.264/AVC or similar. However, the multi-view coding scalable nesting SEI message or similar SEI messages may have the following disadvantages. Firstly, since SEI NAL units in H.264/AVC only have a one-byte NAL unit header, there may be no way to use the information carried in nuh_reserved_zero_6bits and temporal_id_plus1 in the NAL unit header of the HEVC SEI NAL unit for association of a buffering period or picture timing SEI message to operation points. Secondly, each nested SEI message can only be associated with one operation point.

One or more techniques of this disclosure may provide a mechanism to clearly specify the operation points to which a buffering period SEI message, picture timing SEI message or sub-picture timing SEI message applies, through the applicable_operation_points( ) syntax structure that may be carried in a buffering period SEI message, picture timing SEI message, or sub-picture timing SEI message. The mechanism may allow use the information carried in the syntax elements nuh_reserved_zero_6bits and temporal_id_plus1 in the NAL unit header of SEI NAL units, and may allow the sharing of the information conveyed in a same buffering period, picture timing or sub-picture timing SEI message by multiple operation points.

Figure 2:
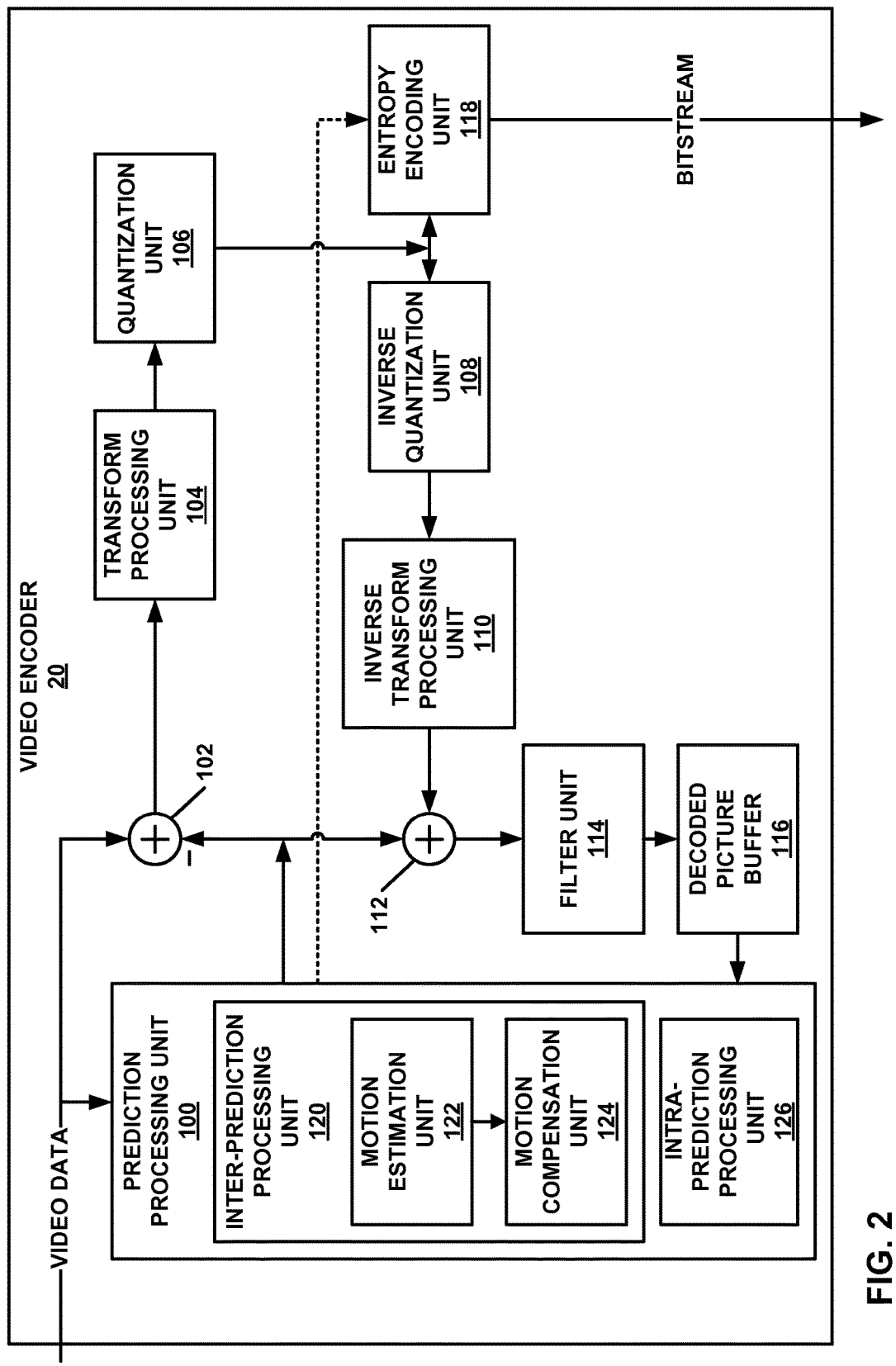
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predictive block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference location associated with the reference regions and a sample block of the PU. The motion information of the PU may include the reference indexes and the motion vectors of the PU. Motion compensation unit 124 may generate the predictive blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

As indicated elsewhere in this disclosure, video encoder 20 may signal a VPS in the bitstream. In HEVC Working Draft 8, particular syntax elements of the VPS (i.e., vps_max_dec_pic_buffering[i], vps_max_num_reorder_pics[i], and vps_max_latency_increase[i]) are defined with reference to a value HighestTid, which is not defined. In accordance with one or more techniques of this disclosure, these syntax elements of the VPS may be defined with reference to a value TargetDecHighestTid, which is defined such that the TargetDecHighestTid as described elsewhere in this disclosure. Table 3, below, illustrates a syntax of a VPS in accordance with one or more techniques of this disclosure.

TABLE 3

| VPS | |
|---|---|
| video_parameter_set_rbsp( ) { | Descriptor |
|   video_parameter_set_id | u(4) |
|   vps_temporal_id_nesting_flag | u(1) |
|   vps_reserved_zero_2bits | u(2) |
|   vps_reserved_zero_6bits | u(6) |
|   vps_max_sub_layers_minus1 | u(3) |
|   profile_tier_level( 1, vps_max_sub_layers_minus1 ) | |
|   vps_reserved_zero_12bits | u(12) |
|   for( i = 0; i <= vps_max_sub_layers_minus1; i++ ) { | |
|     vps_max_dec_pic_buffering[ i ] | ue(v) |
|     vps_max_num_reorder_pics[ i ] | ue(v) |
|     vps_max_latency_increase[ i ] | ue(v) |
|   } | |
|   vps_num_hrd_parameters | ue(v) |
|   for( i = 0; i < vps_num_hrd_parameters; i++ ) { | |
|     operation_point_*layer_ids*( i ) | |
|     hrd_parameters( i = = 0, vps_max_sub_layers_minus1 ) | |
|   } | |
|   vps_extension_flag | u(1) |
|   if( vps_extension_flag ) | |
|     while( more_rbsp_data( ) ) | |
|       vps_extension_data_flag | u(1) |
|   } | |
|   rbsp_trailing_bits( ) | |
| } | |

The italicized portions of Table 3 and other syntax tables or semantics descriptions throughout this disclosure may indicate differences from HEVC Working Draft 8. In accordance with one or more techniques of this disclosure, the semantics for the following syntax elements of the VPS may be changed as follows. The semantics for other syntax elements of the VPS may remain the same as in HEVC Working Draft 8.

vps_max_dec_pic_buffering[i] specifies the required size of the decoded picture buffer in units of picture storage buffers when TargetDecHighestTid is equal to i. The value of vps_max_dec_pic_buffering[i] shall be in the range of 0 to MaxDpbSize (as specified in subclause A.4), inclusive. When i is greater than 0, vps_max_dec_pic_buffering[i] shall be equal to or greater than vps_max_dec_pic_buffering[i−1].

vps_max_num_reorder_pics[i] indicates the maximum allowed number of pictures preceding any picture in decoding order and succeeding that picture in output order when TargetDecHighestTid is equal to i. The value of vps_max_num_reorder_pics[i] shall be in the range of 0 to vps_max_dec_pic_buffering[i], inclusive. When i is greater than 0, vps_max_num_reorder_pics[i] shall be equal to or greater than vps_max_num_reorder_pics[i−1].

vps_max_latency_increase[i] not equal to 0 is used to compute the value of MaxLatencyPictures[i] as specified by setting MaxLatencyPictures[i] to vps_max_num_reorder_pics[i]+vps_max_latency_increase[i]. When vps_max_latency_increase[i] is not equal to 0, the value of MaxLatencyPictures[i] specifies the maximum number of pictures that can precede any picture in the coded video sequence in output order and follow that picture in decoding order when TargetDecHighestTid is equal to i. When vps_max_latency_increase[i] is equal to 0, no corresponding limit is expressed. The value of vps_max_latency_increase[i] shall be in the range of 0 to $2^{32}-2$, inclusive.

As shown above, the semantics of vps_max_dec_buffering[i], vps_max_num_reorder_pics[i], and vps_max_latency_increase[i] may be defined with reference to TargetDecHighestTid. In contrast, HEVC Working Draft 8 defines vps_max_dec_pic_buffering[i], vps_max_num_reorder_pics[i], and vps_max_latency_increase[i] with reference to HighestTid, where HighestTid is not defined.

As shown in the example syntax of Table 3, the VPS includes pairs of operation_point_layer_ids( ) syntax structures and hrd_parameters( ) syntax structures. The hrd_parameters( ) syntax structures include syntax elements that specify sets of HRD parameters. An operation_point_layer_ids( ) syntax structure includes syntax elements that identify a set of operation points. The set of HRD parameters specified in a hrd_parameters( ) syntax structure may be applicable to the operation points identified by the syntax elements in the corresponding operation_point_layer_ids( ) syntax structure. Table 4, below, provides an example syntax for an operation_point_layer_ids( ) syntax structure.

TABLE 4

| Operation Point Layer IDs | |
|---|---|
| operation_point_layer_ids( opIdx ) { | Descriptor |
|   op_num_layer_id_values_minus1[ opIdx ] | ue(v) |
|   for( i = 0; i <= op_num_layer_id_values_minus1[ opIdx ]; i++) | |
|     op_layer_id[ opIdx ][ i ] | u(6) |
| } | |

Section 7.4.4 of HEVC Working Draft 8 describes the semantics of an op_point syntax structure. In accordance with the one or more techniques of this disclosure, section 7.4.4 of HEVC Working Draft 8 may be changed as follows to provide semantics for the operation_point_layer_ids( ) syntax structure of Table 4.

The operation_point_layer_ids(opIdx) syntax structure specifies the set of nuh_reserved_zero_6bits values included in the OpLayerIdSet of the operation points to which the opIdx-th hrd_parameters( ) syntax structure in the video parameter set applies.

op_num_layer_id_values_minus1[opIdx] plus 1 specifies the number of nuh_reserved_zero_6bits values included in the OpLayerIdSet of the operation points to which the opIdx-th hrd_parameters( ) syntax structure in the video parameter set applies. op_num_layer_id_values_minus1[opIdx] shall be less than or equal to 63. In bitstreams conforming to this Specification, op_num_layer_id_values_minus1[opIdx] shall be equal to 0. Although the value of op_num_layer_id_values_minus1[opIdx] is required to be equal to 0 in this version of this Specification, decoders shall allow other values to appear in the op_num_layer_id_values_minus1[opIdx] syntax.

op_layer_id[opIdx][i] specifies the i-th value of nuh_reserved_zero_6bits included in the OpLayerIdSet of the operation points to which the opIdx-th hrd_parameters( ) syntax structure in the video parameter set applies. No value of op_layer_id[opIdx][i] shall be equal to op_layer_id[opIdx][j] when i is not equal to j and both i and j are in the range of 0 to op_num_layer_id_values_minus1, inclusive. op_layer_id[0][0] is inferred to be equal to 0.

As indicated above, the op_num_layer_id_values_minus1[opIdx] syntax element, plus 1, specifies the number of nuh_reserved_zero_6bits values included in the OpLayerIdSet of the operation points to which the opIdx-th hrd_parameters( ) syntax structure in the video parameter set applies. In contrast, HEVC Working Draft 8 provides the op_num_layer_id_values_minus1[opIdx] syntax element, plus 1, specifies the number of nuh_reserved_zero_6bits values included in the operation point identified by opIdx. Similarly, in the example of Table 4, the op_layer_id[opIdx][i] syntax element specifies the i-th value of nuh_reserved_zero_6bits included in the OpLayerIdSet of the operation points to which the opIdx-th hrd_parameters ( ) syntax structure in the video parameter set applies. In contrast, HEVC Working Draft 8 provides that the op_layer_id[opIdx][i] syntax element specifies the i-th value of nuh_reserved_zero_6bits included in the operation point identified by opIdx.

Section 7.4.2.2 of HEVC Working Draft 8 describes semantics for the SPS. In accordance with one or more techniques of this disclosure, the following changes may be made to section 7.4.2.2 of HEVC Working Draft 8. Semantics for other syntax elements of SPS may be the same as in HEVC Working Draft 8:

sps_max_dec_pic_buffering[i] specifies the maximum required size of the decoded picture buffer in units of picture storage buffers when TargetDecHighestTid is equal to i. The value of sps_max_dec_pic_buffering[i] shall be in the range of 0 to MaxDpbSize (as specified in subclause A.4), inclusive. When i is greater than 0, sps_max_dec_pic_buffering[i] shall be equal to or greater than sps_max_dec_pic_buffering[i−1]. The value of sps_max_dec_pic_buffering[i] shall be less than or equal to vps_max_dec_pic_buffering[i] for each value of i.

sps_max_num_reorder_pics[i] indicates the maximum allowed number of pictures preceding any picture in decoding order and succeeding that picture in output order when TargetDecHighestTid is equal to i. The value of sps_max_num_reorder_pics[i] shall be in the range of 0 to sps_max_dec_pic_buffering[i], inclusive. When i is greater than 0, sps_max_num_reorder_pics[i] shall be equal to or greater than sps_max_num_reorder_pics[i−1]. The value of sps_max_num_reorder_pics[i] shall be less than or equal to vps_max_num_reorder_pics[i] for each value of i.

sps_max_latency_increase[i] not equal to 0 is used to compute the value of MaxLatencyPictures[i] as specified by setting MaxLatencyPictures[i] equal to sps_max_num_reorder_pics[i]+sps_max_latency_increase[i]. When sps_max_latency_increase[i] is not equal to 0, the value of MaxLatencyPictures[i] specifies the maximum number of pictures that can precede any picture in the coded video sequence in output order and follow that picture in decoding order when TargetDecHighestTid is equal to i. When sps_max_latency_increase[i] is equal to 0, no corresponding limit is expressed. The value of sps_max_latency_increase[i] shall be in the range of 0 to $2^{32}-2$, inclusive. The value of sps_max_latency_increase[i] shall be less than or equal to vps_max_latency_increase[i] for each value of i.

As shown above, the semantics of sps_max_dec_pic_buffering[i], sps_max_num_reorder_pics[i], and sps_max_latency_increase[i] are defined in terms of TargetDecHighestTid. TargetDecHighestTid is determined as described elsewhere in this disclosure. In contrast, HEVC Working Draft 8 defines the semantics of sps_max_dec_pic_buffering[i], sps_max_num_reorder_pics[i], and sps_max_latency_increase[i] with reference to HighestTid, which is not defined.

Section 7.4.5.1 of HEVC Working Draft 8 describes general slice header semantics. In accordance with one or more techniques of this disclosure, the following changes may be made to section 7.4.5.1 of HEVC Working Draft 8. Other portions of section 7.4.5.1 of HEVC Working Draft 8 may remain the same.

no_output_of_prior_pics_flag specifies how the previously-decoded pictures in the decoded picture buffer are treated after decoding of an IDR or a BLA picture. See Annex C. When the current picture is a CRA picture, or the current picture is an IDR or BLA picture that is the first picture in the bitstream, the value of no_output_of_prior_pics_flag has no effect on the decoding process. When the current picture is an IDR or BLA picture that is not the picture in the bitstream, and the value of pic_width_in_luma_samples or pic_height_in_luma_samples or sps_max_dec_pic_buffering[TargetDecHighestTid] derived from the active sequence parameter set is different from the value of pic_width_in_luma_samples or pic_height_in_ luma_samples or sps_max_dec_pic_buffering[TargetDecHighestTid] derived from the sequence parameter set active for the preceding picture, no_output_of_prior_pics_flag equal to 1 may (but should not) be inferred by the decoder, regardless of the actual value of no_output_of_prior_pics_flag.

As shown above, the semantics of no_output_of_prior_pics_flag are defined with reference to sps_max_dec_pic_buffering[TargetDecHighestTid]. TargetDecHighestTid is determined as described elsewhere in this disclosure. In contrast, HEVC Working Draft 8 defines the semantics of no_output_of_prior_pics_flags with reference to sps_max_dec_pic_buffering[HighestTid], where HighestTid is not defined.

Section 8.1 of HEVC Working Draft 8 describes a general decoding process. In accordance with one or more techniques of this disclosure, the general decoding process of HEVC Working Draft 8 may be changed as follows.

The input of this process is a bitstream and the output is a list of decoded pictures.

The set TargetDecLayerIdSet, which specifies the set of values for nuh_reserved_zero_6bits of VCL NAL units to be decoded, is specified as follows:

If some external means not specified in this Specification is available to set TargetDecLayerIdSet, TargetDecLayerIdSet is set by the external means.

Otherwise if the decoding process is invoked in a bitstream conformance test as specified in subclause C.1, TargetDecLayerIdSet is set as specified in subclause C.1.

Otherwise, TargetDecLayerIdSet contains only one value for nuh_reserved_zero_6bits, which is equal to 0.

The variable TargetDecHighestTid, which identifies the highest temporal sub-layer to be decoded, is specified as follows:

If some external means not specified in this Specification is available to set TargetDecHighestTid, TargetDecHighestTid is set by the external means.

Otherwise if the decoding process is invoked in a bitstream conformance test as specified in subclause C.1, TargetDecHighestTid is set as specified in subclause C.1.

Otherwise, TargetDecHighestTid is set to sps_max_sub_layers_minus1.

The sub-bitstream extraction process as specified in subclause 10.1 is applied with TargetDecHighestTid and TargetDecLayerIdSet as inputs and the output is assigned to a bitstream referred to as BitstreamToDecode.

The following applies to each coded picture (referred to as the current picture, which is denoted by the variable CurrPic) in BitstreamToDecode.

Depending on the value of chroma_format_idc, the number of sample arrays of the current picture is as follows.

If chroma_format_idc is equal to 0, the current picture consists of 1 sample array $S_L$.

Otherwise (chroma_format_idc is not equal to 0), the current picture consists of 3 sample arrays $S_L$, $S_{Cb}$, $S_{Cr}$.

The decoding process for the current picture takes the syntax elements and upper-case variables from clause 7 as input. When interpreting the semantics of each syntax element in each NAL unit and "the bitstream" or part thereof (e.g., a coded video sequence) is involved, the bitstream or part thereof means BitstreamToDecode or part thereof.

The decoding process is specified such that all decoders shall produce numerically identical results. Any decoding process that produces identical results to the process described herein conforms to the decoding process requirements of this Specification.

When the current picture is a CRA picture, the following applies:

If some external means not specified in this Specification is available to set the variable HandleCraAsBlaFlag to a value, HandleCraAsBlaFlag is set to the value provided by the external means.

Otherwise, the value of HandleCraAsBlaFlag is set to 0.

When the current picture is a CRA picture and HandleCraAsBlaFlag is equal to 1, the following applies during the parsing and decoding processes for each coded slice NAL unit:

The value of nal_unit_type is set to BLA_W_LP.

The value of no_output_of_prior_pics_flag is set to 1.

NOTE 1—Decoder implementations may choose to set the value of no_output_of_prior_pics_flag to 0 when the setting does not affect decoding of the current picture and the following pictures in decoding order, e.g. when there is always a picture storage buffer available when needed.

Each picture referred to in this clause is a complete coded picture.

Depending on the value of separate_colour_plane_flag, the decoding process is structured as follows.

If separate_colour_plane_flag is equal to 0, the decoding process is invoked a single time with the current picture being the output.

Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a coded video sequence with monochrome color format with that particular value of colour_plane_id would be present in the bitstream. The output of each of the three decoding processes is assigned to the 3 sample arrays of the current picture with the NAL units with colour_plane_id equal to 0 being assigned to $S_L$, the NAL units with colour_plane_id equal to 1 being assigned to $S_{Cb}$, and the NAL units with colour_plane_id equal to 2 being assigned to $S_{Cr}$.

NOTE 1—The variable ChromaArrayType is derived as 0 when separate_colour_plane_flag is equal to 1 and chroma_format_idc is equal to 3. In the decoding process, the value of this variable is evaluated resulting in operations identical to that of monochrome pictures with chroma_format_idc being equal to 0.

The decoding process operates as follows for the current picture CurrPic:

1. The decoding of NAL units is specified in subclause 8.2.
2. The processes in subclause 8.3 specify decoding processes using syntax elements in the slice layer and above:

Variables and functions relating to picture order count are derived in subclause 8.3.1 (which only needs to be invoked for the first slice of a picture).

The decoding process for reference picture set in subclause 8.3.2 is invoked, wherein reference pictures may be marked as "unused for reference" or "used for long-term reference" (which only needs to be invoked for the first slice of a picture).

When the current picture is a BLA picture or is a CRA picture that is the first picture in the bitstream, the decoding process for generating unavailable reference pictures specified in subclause 8.3.3 is invoked (which only needs to be invoked for the first slice of a picture).

PicOutputFlag is set as follows:

If the current picture is a TFD picture and the previous RAP picture in decoding order is a BLA picture or is a CRA picture that is the first coded picture in the bitstream, PicOutputFlag is set equal to 0.

Otherwise, PicOutputFlag is set equal to pic_output_flag.

At the beginning of the decoding process for each P or B slice, the decoding process for reference picture lists construction specified in subclause 8.3.4 is invoked for derivation of reference picture list 0 (RefPicList0), and when decoding a B slice, reference picture list 1 (RefPicList1).

After all slices of the current picture have been decoded, the decoded picture is marked as "used for short-term reference".

3. The processes in subclauses 8.4, 8.5, 8.6, and 8.7 specify decoding processes using syntax elements in the coding tree unit layer and above.

As indicated elsewhere in this disclosure, in HEVC Working Draft 8, when the decoding process is invoked for any bitstream conformance test, the semantics of syntax elements are not clearly specified as the values of TargetDecLayerIdSet and TargetDecHighestTid are not properly set. The modifications shown above to the general decoding process may remedy this issue. As shown above, when the general decoding process is invoked for a bitstream conformance test, the values of TargetDecLayerIdSet and TargetDecHighestTid are set as specified in subclause C.1. As described below, a modified version of subclause C.1 may set TargetDecLayerIdSet to the set of nuh_reserved_zero_6bits values present in the sub-bitstream corresponding to the operation point under test. The modified version of subclause C.1 may set TargetDecHighestTid to the greatest TemporalId value present in the sub-bitstream corresponding to the operation point under test.

In this way, a device, such as video decoder 30, may perform a decoding process as part of performing a bitstream conformance test. Performing the decoding process may comprise performing a bitstream extraction process to extract, from a bitstream, an operation point representation of an operation point defined by a target set of layer identifiers and a target highest temporal identifier. The target set of layer identifiers may contain values of layer identifier syntax elements present in the operation point representation, the target set of layer identifiers being a subset of values of layer identifier syntax elements of the bitstream. The target highest temporal identifier may be equal to a greatest temporal identifier present in the operation point representation, the target highest temporal identifier being less than or equal to a greatest temporal identifier present in the bitstream. Furthermore, the device may decode NAL units of the operation point representation.

As indicated in the modifications to section 8.1 above, the decoding process is not necessarily performed as part of the bitstream conformance test. In some instances where the decoding process is not performed as part of a bitstream conformance test, a device may perform the bitstream extraction process to extract, from the bitstream, an operation point representation of an operation point. In this case, 0 may be the only value of layer identifier syntax elements (e.g., nuh_reserved_zero_6bits) present in the operation point representation, and the greatest temporal identifier present in the bitstream is equal to a greatest temporal identifier present in the operation point representation of the operation point. The device may decode NAL units of the operation point representation of the second operation point.

Alternatively, the device may receive, from an external source, a target set of layer identifiers and a target highest temporal identifier. The target set of layer identifiers may contain values of layer identifier syntax elements present in an operation point representation of an operation point that is defined by the target set of layer identifiers and the target highest temporal identifier. The target highest temporal identifier may be equal to a greatest temporal identifier present in the operation point representation of the operation point. Furthermore, the device may perform the bitstream extraction process to extract, from the bitstream, the operation point representation of the operation point. In addition, the device may decode NAL units of the operation point representation of the operation point.

Furthermore, in accordance with one or more techniques of this disclosure, the sub-bitstream extraction process described in subclause 10.1 of HEVC Working Draft 8 may be changed as follows.

It is requirement of bitstream conformance that any sub-bitstream that is included in the output of the process specified in this subclause with tIdTarget equal to any value in the range of 0 to 6, inclusive, and with layerIdSetTarget containing only the value 0 shall be conforming to this Specification.

NOTE—A conforming bitstream contains one or more coded slice NAL units with nuh_reserved_zero_6bits equal to 0 and TemporalId equal to 0.

Inputs to this process are a variable tIdTarget and a set layerIdSetTarget.

Output of this process is a sub-bitstream.

The sub-bitstream is derived by removing from the bitstream all NAL units with TemporalId greater than tIdTarget or nuh_reserved_zero_6bits not among the values in layerIdSetTarget.

In subclause 10.1 of HEVC Working Draft 8, the variable name targetDecLayerIdSet is used where layerIdSetTarget is used above. The changes shown above to subclause 10.1 of HEVC Working Draft to use layerIdSetTarget may serve to clarify that there may be a distinction between the set of layer identifiers used in the sub-bitstream extraction process and targetDecLayerIdSet, which, as described elsewhere in this disclosure, has a particular definition.

Furthermore, in accordance with one or more techniques of this disclosure, the general tier and level specifications of section A.4.1 of HEVC Working Draft 8 may be changed as follows. In this disclosure, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values.

Alternatively, the constraints may take the form of constraints on arithmetic combinations of values (e.g., picture width multiplied by picture height multiplied by number of pictures decoded per second). A level specified for a lower tier is more constrained than a level specified for a higher tier. In accordance with an example of this disclosure, the "general level specifications" section (i.e. section A.4.1) of HEVC Working Draft 8 is re-titled "General tier and level specifications," and the text is changed as follows. Table A-1 may remain the same as in HEVC Working Draft 8.

For purposes of comparison of tier capabilities, the tier with general_tier_flag equal to 0 shall be considered to be a lower tier than the tier with general_tier_flag equal to 1.

For purposes of comparison of level capabilities, for a specific tier, a lower level has a lower value of general_level_idc.

The following is specified for expressing the constraints in this annex.

Let access unit n be the n-th access unit in decoding order, with the first access unit being access unit 0 (i.e. the 0-th access unit).

Let picture n be the coded picture or the corresponding decoded picture of access unit n.

Let the variable fR be set to 1÷300.

Bitstreams conforming to a profile at a specified level shall obey the following constraints for each bitstream conformance test as specified in Annex C:

a) The nominal removal time of access unit n (with n>0) from the CPB as specified in subclause C.2.2 satisfies the constraint that $t_{r,n}(n)-t_r(n-1)$ is equal to or greater than Max (PicSizeInSamplesY÷MaxLumaSR, fR) for the value of PicSizeInSamplesY of picture n−1, where MaxLumaSR is the value specified in Table A-1 that applies to picture n−1.

b) The difference between consecutive output times of pictures from the DPB as specified in subclause C.3.2 satisfies the constraint that $\Delta t_{o,dpb}(n)>=$Max (PicSizeInSamplesY÷MaxLumaSR, fR) for the value of PicSizeInSamplesY of picture n, where MaxLumaSR is the value specified in Table A-1 for picture n, provided that picture n is a picture that is output and is not the last picture of the bitstream that is output.

c) PicSizeInSamplesY<=MaxLumaPS, where MaxLumaPS is specified in Table A-1.

d) pic_width_in_luma_samples<=Sqrt(MaxLumaPS*8)

e) pic_height_in_luma_samples<=Sqrt(MaxLumaPS*8)

f) sps_max_dec_pic_buffering[TargetDecHighestTid] <=MaxDpbSize, where MaxDpbSize is derived as specified by the following:

```
if ( PicSizeInSamplesY <= ( MaxLumaPS >> 2) )
  MaxDpbSize = Min( 4 * MaxDpbPicBuf, 16 )
else if ( PicSizeInSamplesY <= ( MaxLumaPS >> 1 ) )
  MaxDpbSize = Min( 2 * MaxDpbPicBuf, 16 )
else if ( PicSizeInSamplesY <= ( MaxLumaPS << 1) / 3 )
  MaxDpbSize = Min( (3 * MaxDpbPicBuf) >> 1, 16 )
else if ( PicSizeInSamplesY <= ( ( 3 * MaxLumaPS ) >> 2) )
  MaxDpbSize = Min( (4 * MaxDpbPicBuf) / 3, 16 )
else
  MaxDpbSize = MaxDpbPicBuf
``` where MaxLumaPS is specified in Table A-1 and MaxDpbPicBuf is equal to 6.

Table A-1 specifies the limits for each level of each tier. The use of the MinCR parameter column of Table A-1 is specified in subclause A.4.2.

A tier and level to which the bitstream conforms shall be indicated by the syntax elements general_tier_flag and general_level_idc as follows.

general_tier_flag equal to 0 indicates conformance to the Main tier, and general_tier_flag equal to 1 indicates conformance to the High tier, according to the tier constraint specifications in Table A-1. general_tier_flag shall be equal to 0 for levels below level 4 (corresponding to the entries in Table A-1 marked with "−"). Level limits other than MaxBR and MaxCPB in Table A-1 are common for both the Main tier and the High tier.

general_level_idc shall be set equal to a value of 30 times the level number specified in Table A-1.

As indicated in item (f) above, bitstreams conforming to a profile at a specified level obey the constraint that sps_max_dec_pic_buffering[TargetDecHighestTid]<=MaxDpbSize. TargetDecHighestTid may be defined in the manner described elsewhere in this disclosure. In contrast, HEVC Working Draft 8 indicates for item (f) that bitstreams conforming to a profile at a specified level obey the constraint that sps_max_dec_pic_buffering[sps_max_temporal_layers_minus1]<=MaxDpbSize. As indicated elsewhere in this disclosure, the parameters sps_max_dec_pic_buffering[i] may not be properly selected in level restrictions. Replacing sps_max_temporal_layers_minus1 with TargetDecHighestTid as the index i of sps_max_dec_pic_buffering[i] may, in accordance with one or more techniques of this disclosure, ensure that level restrictions are consistently selected with i equal to the clearly-specified value of TargetDecHighestTid.

In this way, a decoding process of a HRD may decode, from a SPS, an array of syntax elements (e.g., sps_max_dec_pic_buffering[ ]) where each of the syntax elements in the array indicates a maximum required size of a DPB of the HRD. Furthermore, when a device performs a HRD operation, the device may determine, based on the target highest temporal identifier (e.g., TargetDecHighestTid), a particular syntax element in the array (e.g., sps_max_dec_pic_buffering[TargetDecHighestTid]). Furthermore, the device may determine that the bitstream is not in conformance with the video coding standard when a value of the particular syntax element is greater than a maximum DPB size (e.g., MaxDpbSize).

Furthermore, in accordance with one or more example techniques of this disclosure, section A.4.2 of HEVC Working Draft 8 may be changed as follows. Section A.4.2 of HEVC Working Draft 8 describes profile-specific level limits for the Main profile. Table A-2 may remain the same as in HEVC Working Draft 8.

Bitstreams conforming to the Main profile at a specified tier and level shall obey the following constraints for the bitstream conformance tests as specified in Annex C:

a) The number of slices (with dependent_slice_flag equal to either 0 or 1) in a picture is less than or equal to MaxSlicesPerPicture, where MaxSlicesPerPicture is specified in Table A-1.

b) For the VCL HRD parameters, BitRate[SchedSelIdx]<=cpbBrVclFactor*MaxBR and CpbSize[SchedSelIdx]<=cpbBrVclFactor*MaxCPB for at least one value of SchedSelIdx, where cpbBrVclFactor is specified in Table A-2 and BitRate[SchedSelIdx] and CpbSize[SchedSelIdx] are given as follows.

If vcl_hrd_parameters_present_flag is equal to 1, BitRate[SchedSelIdx] and CpbSize[SchedSelIdx] are given by Equations E-45 and E-46, respectively, using the syntax elements that are selected as specified in subclause C.1.

Otherwise (vcl_hrd_parameters_present_flag is equal to 0), BitRate[SchedSelIdx] and CpbSize[SchedSelIdx] are inferred as specified in subclause E.2.3 for VCL HRD parameters.

MaxBR and MaxCPB are specified in Table A-1 in units of cpbBrVclFactor bits/s and cpbBrVclFactor bits, respectively. The bitstream shall satisfy these conditions for at least one value of SchedSelIdx in the range 0 to cpb_cnt_minus1[TargetDecHighestTid], inclusive.

c) For the NAL HRD parameters, BitRate[SchedSelIdx]<=cpbBrNalFactor*MaxBR and CpbSize[SchedSelIdx]<=cpbBrNalFactor*MaxCPB for at least one value of SchedSelIdx, where cpbBrNalFactor is specified in Table A-2 and BitRate[SchedSelIdx] and CpbSize[SchedSelIdx] are given as follows.

If nal_hrd_parameters_present_flag is equal to 1, BitRate[SchedSelIdx] and CpbSize[SchedSelIdx] are given by Equations E-45 and E-46, respectively, using the syntax elements that are selected as specified in subclause C.1.

Otherwise (nal_hrd_parameters_present_flag is equal to 0), BitRate[SchedSelIdx] and CpbSize

[SchedSelIdx] are inferred as specified in subclause E.2.3 for NAL HRD parameters.

MaxBR and MaxCPB are specified in Table A-1 in units of cpbBrNalFactor bits/s and cpbBrNalFactor bits, respectively. The bitstream shall satisfy these conditions for at least one value of SchedSelIdx in the range 0 to cpb_cnt_minus1[TargetDecHighestTid], inclusive.

d) The sum of the NumBytesInNALunit variables for access unit 0 is less than or equal to 1.5*(Max (PicSizeInSamplesY, fR*MaxLumaSR)+MaxLumaSR*($t_r(0)-t_{r,n}(0)$))÷MinCR for the value of PicSizeInSamplesY of picture 0, where MaxLumaPR and MinCR are the values specified in Table A-1 that apply to picture 0.

e) The sum of the NumBytesInNALunit variables for access unit n with n>0 is less than or equal to 1.5*MaxLumaSR*($t_r(n)-t_r(n-1)$)÷MinCR, where MaxLumaSR and MinCR are the values specified in Table A-1 that apply to picture n.

f) For level 5 and higher levels, the variable CtbSizeY shall be equal to 32 or 64.

g) The value of NumPocTotalCurr shall be less than or equal to 8.

h) The value of num_tile_columns_minus1 shall be less than MaxTileCols and num_tile_rows_minus1 shall be less than MaxTileRows, where MaxTileCols and MaxTileRows are as specified in Table A-1.

As indicated elsewhere in this disclosure, the parameters cpb_cnt_minus1[i] may not be properly selected in level restrictions. HEVC Working Draft 8 specifies that "the bitstream shall satisfy these conditions for at least one value of SchedSelIdx in the range 0 to cpb_cnt_minus1, inclusive . . . ." Specifying TargetDecHighestTid as the index i of cpb_cnt_minus1[i] may, in accordance with one or more techniques of this disclosure, ensure that level restrictions are consistently selected with i equal to the clearly-specified value of TargetDecHighestTid.

Furthermore, in accordance with one or more techniques of this disclosure, the general subclause C.1 in Annex C of HEVC Working Draft 8 may be modified. The figures C-1 and C-2 of subclause C.1 of HEVC Working Draft 8 may remain the same as in HEVC WD8. The text of subclause C.1 of HEVC Working Draft 8 may be changed as follows.

This annex specifies the hypothetical reference decoder (HRD) and its use to check bitstream and decoder conformance.

Two types of bitstreams are subject to HRD conformance checking for this Specification. The first type of bitstream, called Type I bitstream, is a NAL unit stream containing only the VCL NAL units and NAL units with nal_unit_type equal to FD_NUT (filler data NAL units) for all access units in the bitstream. The second type of bitstream, called a Type II bitstream, contains, in addition to the VCL NAL units and filler data NAL units for all access units in the bitstream, at least one of the following:

additional non-VCL NAL units other than filler data NAL units, all leading_zero_8bits, zero_byte, start_code_prefix_one_3bytes, and trailing_zero_8bits syntax elements that form a byte stream from the NAL unit stream (as specified in Annex B).

Figure C-1 shows the types of bitstream conformance points checked by the HRD.

The syntax elements of non-VCL NAL units (or their default values for some of the syntax elements) required for the HRD are specified in the semantic subclauses of clause 7, Annexes D and E.

Two types of HRD parameters (NAL HRD parameters and VCL HRD parameters) are used. The HRD parameters are signaled through the video parameter set syntax structure or through video usability information as specified in subclauses E.1 and E.2, which is part of the sequence parameter set syntax structure.

Multiple tests may be needed for checking the conformance of a bitstream. For each test, the following steps apply in the order listed:

1. An operation point under test, denoted as TargetOp, is selected. TargetOp is identified by OpLayerIdSet equal to targetOpLayerIdSet and OpTid equal to targetOpTid. targetOpLayerIdSet contains the set of values for nuh_reserved_zero_6bits present in the bitstream subset associated with TargetOp and shall be a subset of values for nuh_reserved_zero_6bits present in the bitstream under test. targetOpTid is equal to the greatest TemporalId present in the bitstream subset associated with TargetOp and shall be less than or equal to the greatestTemporalId present in the bitstream under test.

2. TargetDecLayerIdSet is set to targetOpLayerIdSet, TargetDecHighestTid is set to targetOpTid, and BitstreamToDecode is set to the output of the sub-bitstream extraction process as specified in subclause 10.1 with TargetDecHighestTid and TargetDecLayerIdSet as inputs.

3. The hrd_parameters( ) syntax structure and the sub_layer_hrd_parameters( ) syntax structure applicable to TargetOp are selected. If TargetDecLayerIdSet contains only the value 0, the hrd_parameters( ) syntax structure in the active sequence parameter set is selected. Otherwise, the hrd_parameters( ) syntax structure that is in the active sequence parameter set (or provided through an external means) and for which the set of values specified by op_layer_id[opIdx][i] for i in the range of 0 to op_num_layer_id_values_minus1[opIdx], inclusive, is identical to TargetDecLayerIdSet is selected. Within the selected hrd_parameters( ) syntax structure, if BitstreamToDecode is a Type I bitstream, the sub_layer_hrd_parameters(TargetDecHighestTid) syntax structure that immediately follows the condition "if (vcl_hrd_parameters_present_flag)" is selected (in this case the variable NalHrdModeFlag is set equal to 0), otherwise (BitstreamToDecode is a Type II bitstream), the sub_layer_hrd_parameters(TargetDecHighestTid) syntax structure that either immediately follows the condition "if(vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected, and all non-VCL NAL units except for filler data NAL units are discarded from BitstreamToDecode in the former case and the result is assigned to BitstreamToDecode.

4. An access unit associated with a buffering period SEI message applicable to TargetOp is selected as the HRD initialization point and referred to as access unit 0.

5. SEI messages including timing information are selected. The buffering period SEI message that is coded in access unit 0 and applies to TargetOp, as indicated by the applicable_operation_points( ) syntax structure, is selected. For each access unit in BitstreamToDecode starting from access unit 0, the picture timing SEI message that is associated with the access unit and applies to TargetOp, as indicated by the applicable_operation_points( ) syntax structure, is selected, and when SubPicCpbFlag is equal to 1 and sub_pic_cpb_params_in_pic_timing_sei_flag is equal to 0, the sub-picture timing SEI messages that are associated with decoding units in the access unit and apply to TargetOp, as indicated by the applicable_operation_points( ) syntax structures, are selected.

6. A value of SchedSelIdx is selected. The selected SchedSelIdx shall be in the range of 0 to cpb_cnt_minus1[TargetDecHighestTid], inclusive, where cpb_cnt_minus1[TargetDecHighestTid] is found in the sub_layer_hrd_parameters(TargetDecHighestTid) syntax structure as selected above.

7. The initial CPB removal delay and delay offset is selected and TFD access units associated with access unit 0 may be discarded from BitstreamToDecode. If the coded picture in access unit 0 has nal_unit_type equal to CRA_NUT or BLA_W_LP, and rap_cpb_params_present_flag in the selected buffering period SEI message is equal to 1, either the default initial CPB removal delay and delay offset represented by the initial_cpb_removal_delay[SchedSelIdx] and initial_cpb_removal_delay_offset[SchedSelIdx] corresponding to NalHrdModeFlag (in this case the variable DefaultInitCpbParamsFlag is set equal to 1) or the alternative initial CPB removal delay and delay offset represented by the initial_alt_cpb_removal_delay[SchedSelIdx] and initial_alt_cpb_removal_delay_offset[SchedSelIdx] corresponding to NalHrdModeFlag (in this case the variable DefaultInitCpbParamsFlag is set equal to 0) is selected, and TFD access units associated with access unit 0 are discarded from BitstreamToDecode in the latter case and the result is assigned to BitstreamToDecode. Otherwise, the default initial CPB removal delay and delay offset is selected (in this case the variable DefaultInitCpbParamsFlag is set equal to 1).

The number of bitstream conformance tests carried out is equal to N1*N2*N3*(N4*2+N5), where the values of N1, N2, N3, N4 and N5 are specified as follows.

N1 is the number of operation points contained in the bitstream under test.

If BitstreamToDecode is a Type I bitstream, N2 is equal to 1, otherwise (BitstreamToDecode is a Type II bitstream) N2 is equal to 2.

N3 is equal to cpb_cnt_minus1[TargetDecHighestTid]+1.

N4 is the number of access units associated with buffering period SEI messages applicable to TargetOp in BitstreamToDecode, where the coded picture in each of these access units has nal_unit_type equal to CRA_NUT or BLA_W_LP, and the associated buffering period SEI message applicable to TargetOp has rap_cpb_params_present_flag equal to 1.

N5 is the number of access units associated with buffering period SEI messages applicable to TargetOp in BitstreamToDecode, where the coded picture in each of these access units has nal_unit_type not equal to one of CRA_NUT and BLA_W_LP, or the associated buffering period SEI message applicable to TargetOp has rap_cpb_params_present_flag equal to 0.

When BitstreamToDecode is a Type II bitstream, if the sub_layer_hrd_parameters(TargetDecHighestTid) syntax structure that immediately follows the condition "if(vcl_hrd_parameters_present_flag)" is selected, the test is conducted at the Type I conformance point shown in Figure C-1, and only VCL and filler data NAL units are counted for the input bit rate and CPB storage; otherwise (the sub_layer_hrd_parameters(TargetDecHighestTid) syntax structure that immediately follows the condition "if(nal_hrd_parameters_present_flag)" is selected, the tests is conducted at the Type II conformance point shown in Figure C-1, and all NAL units (of a Type II NAL unit stream) or all bytes (of a byte stream) are counted for the input bit rate and CPB storage.

NOTE 3—NAL HRD parameters established by a value of SchedSelIdx for the Type II conformance point shown in Figure C-1 are sufficient to also establish VCL HRD conformance for the Type I conformance point shown in Figure C-1 for the same values of InitCpbRemovalDelay[SchedSelIdx], BitRate[SchedSelIdx], and CpbSize[SchedSelIdx] for the VBR case (cbr_flag[SchedSelIdx] equal to 0). This is because the data flow into the Type I conformance point is a subset of the data flow into the Type II conformance point and because, for the VBR case, the CPB is allowed to become empty and stay empty until the time a next picture is scheduled to begin to arrive. For example, when decoding a coded video sequence conforming to one or more of the profiles specified in Annex A using the decoding process specified in clauses 2-9, when NAL HRD parameters are provided for the Type II conformance point that not only fall within the bounds set for NAL HRD parameters for profile conformance in item c) of subclause A.4.2 but also fall within the bounds set for VCL HRD parameters for profile conformance in item b) of subclause A.4.2, conformance of the VCL HRD for the Type I conformance point is also assured to fall within the bounds of item b) of subclause A.4.2.

All video parameter sets, sequence parameter sets and picture parameter sets referred to in the VCL NAL units and the corresponding buffering period and picture timing SEI messages shall be conveyed to the HRD, in a timely manner, either in the bitstream (by non-VCL NAL units), or by other means not specified in this Specification.

In Annexes C, D, and E, the specification for "presence" of non-VCL NAL units is also satisfied when those NAL units (or just some of them) are conveyed to decoders (or to the HRD) by other means not specified by this Specification. For the purpose of counting bits, only the appropriate bits that are actually present in the bitstream are counted.

NOTE 1—As an example, synchronization of a non-VCL NAL unit, conveyed by means other than presence in the bitstream, with the NAL units that are present in the bitstream, can be achieved by indicating two points in the bitstream, between which the non-VCL NAL unit would have been present in the bitstream, had the encoder decided to convey it in the bitstream.

When the content of a non-VCL NAL unit is conveyed for the application by some means other than presence within the bitstream, the representation of the content of the non-VCL NAL unit is not required to use the same syntax as specified in this Specification.

NOTE 2—When HRD information is contained within the bitstream, it is possible to verify the conformance of a bitstream to the requirements of this subclause based solely on information contained in the bitstream. When the HRD information is not present in the bitstream, as is the case for all "stand-alone" Type I bitstreams, conformance can only be verified when the HRD data is supplied by some other means not specified in this Specification.

The HRD contains a coded picture buffer (CPB), an instantaneous decoding process, a decoded picture buffer (DPB), and output cropping as shown in Figure C-2.

For each bitstream conformance test, the CPB size (number of bits) is CpbSize[SchedSelIdx] as specified by Equation E-46, where SchedSelIdx and the HRD parameters are selected as specified above in this subclause. The DPB size (number of picture storage buffers) is sps_max_dec_pic_buffering[TargetDecHighestTid].

The variable SubPicCpbPreferredFlag is either specified by external means, or when not specified by external means, set to 0.

The variable SubPicCpbFlag is derived as follows:
SubPicCpbFlag=SubPicCpbPreferredFlag && sub_pic_cpb_params_present_flag(C-1)

If SubPicCpbFlag is equal to 0, the CPB operates at access unit level and each decoding unit is an access unit. Otherwise the CPB operates at sub-picture level and each decoding unit is a subset of an access unit.

The HRD operates as follows. Data associated with decoding units that flow into the CPB according to a specified arrival schedule are delivered by the HSS. The data associated with each decoding unit are removed and decoded instantaneously by the instantaneous decoding process at the CPB removal time of the decoding unit. Each decoded picture is placed in the DPB. A decoded picture is removed from the DPB as specified in subclause C.3.1 or subclause C.5.2.

The operation of the CPB for each bitstream conformance test is specified in subclause C.2. The instantaneous decoder operation is specified in clauses 2-9. The operation of the DPB for each bitstream conformance test is specified in subclause C.3. The output cropping for each bitstream conformance test is specified in subclause C.3.2 and subclause C.5.2.

HSS and HRD information concerning the number of enumerated delivery schedules and their associated bit rates and buffer sizes is specified in subclauses E.1.1, E.1.2, E.2.1, and E.2.2. The HRD is initialized as specified by the buffering period SEI message as specified in subclauses D.1.1 and D.2.1. The removal timing of decoding units from the CPB and output timing of decoded pictures from the DPB are specified in the picture timing SEI message as specified in subclauses D.1.2 and D.2.1. All timing information relating to a specific decoding unit shall arrive prior to the CPB removal time of the decoding unit.

The requirements for bitstream conformance are specified in subclause C.4, and the HRD is used to check conformance of decoders as specified in subclause C.5.

NOTE 3—While conformance is guaranteed under the assumption that all picture rates and clocks used to generate the bitstream match exactly the values signaled in the bitstream, in a real system each of these may vary from the signaled or specified value.

All the arithmetic in this annex is done with real values, so that no rounding errors can propagate. For example, the number of bits in a CPB just prior to or after removal of a decoding unit is not necessarily an integer.

The variable $t_c$ is derived as follows and is called a clock tick:

$$t_c = \text{num\_units\_in\_tick} \div \text{time\_scale} \qquad \text{(C-1)}$$

The variable $t_{c\_sub}$ is derived as follows and is called a sub-picture clock tick:

$$t_{c\_sub} = t_c \div (\text{tick\_divisor\_minus2} + 2) \qquad \text{(C-2)}$$

The following is specified for expressing the constraints in this annex:
  Let access unit n be the n-th access unit in decoding order with the first access unit being access unit 0 (i.e. the 0-th access unit).
  Let picture n be the coded picture or the decoded picture of access unit n.
  Let decoding unit m be the m-th decoding unit in decoding order with the first decoding unit being decoding unit 0.

The modifications to section C.1 of HEVC Working Draft 8 above may clarify the bitstream conformance tests. As indicated above, when the decoding process is invoked for the bitstream conformance test in HEVC Working Draft 8, the semantics of syntax elements are not clearly specified as the values of TargetDecLayerIdSet and TargetDecHighestTid are not properly set. The modifications to section C.1 clarify the definitions of TargetDecLayerIdSet and TargetDecHighestTid.

As shown in the above modifications to section C.1 of HEVC Working Draft 8, a device may perform an HRD operation (such as a bitstream conformance test) that selects an operation point, determines a target set of layer identifiers (TargetDecLayerIdSet) of the operation point and the highest temporal identifier (TargetDecHighestTid). Furthermore, in the HRD operation, the device may select a set of HRD parameters applicable to the operation point and use the selected set of HRD parameters to configure a HRD that performs the decoding process. The set of HRD parameters applicable to the particular operation point may include parameters that specify an initial CPB removal delay, a CPB size, a bit rate, an initial DPB output delay, a DPB size, and so on. The HRD operation may include performing a decoding process.

In some examples, the device may select, from among one or more sets of HRD parameters (e.g., hrd_parameters( ) syntax structures) in a VPS and a set of HRD parameters in a SPS, the set of HRD parameters applicable to the operation point. In some examples, the device may determine the set of HRD parameters in the SPS is applicable to the particular operation point when a layer identifier set of the operation point contains a set of all layer identifiers present in a coded video sequence associated with the SPS. Furthermore, in some examples, the device may select the set of HRD parameters in the SPS in response to determining that the target layer identifier set (e.g., TargetDecLayerIdSet) of the operation point contains only the value 0. In some examples, the device may select a set of HRD parameter in the SPS in response to determining that a set of layer identifiers (e.g., op_layer_id[ ][ ]) is identical to the target layer identifier set (e.g., TargetDecLayerIdSet) of the operation point.

Furthermore, as shown in the above modifications to section C.1 of HEVC Working Draft 8 and other portions of this disclosure, the device may decode, from a SPS, the array of syntax elements (sps_max_dec_pic_buffering[ ]) that each indicate a maximum required size of a DPB of the HRD. The device may determine, based on the target highest temporal identifier, a particular syntax element in the array (i.e., sps_max_dec_pic_buffering[TargetDecHighestTid]). As indicated above, a number of picture storage buffers in the DPB is indicated by the particular syntax element (i.e., the DPB size (number of picture storage buffers) is sps_max_dec_pic_buffering[TargetDecHighestTid]).

In addition, a decoding process may decode a HRD parameters syntax structure (hrd_parameters( )) that includes the selected set of HRD parameters. The selected set of HRD parameters includes an array of syntax elements (cbp_cnt_minus1[ ]) that each indicate a number of alternative CPB specifications in the bitstream. The modifications to section C.1 of HEVC Working Draft 8 clarify that when a device performs a HRD operation, the device may select, based on the target highest temporal identifier (TargetDecHighestTid), a particular syntax element in the array (cpb_cnt_minus1[TargetDecHighestTid]) and may select a scheduler selection index (SchedSelIdx) in a range of 0 to a value of the particular syntax element. The device may determine, based at least in part on the scheduler selection index, an initial CPB removal delay of a CPB of the HRD.

Section C.2.1 of HEVC Working Draft 8 relates to removal of pictures from the DPB for bitstream conformance. In accordance with one or more example techniques of this disclosure, section C.2.1 of HEVC Working Draft 8 may be changed as follows:

The specifications in this subclause apply independently to each set of DPB parameters selected as specified in subclause C.1.

The removal of pictures from the DPB before decoding of the current picture (but after parsing the slice header of the first slice of the current picture) happens instantaneously at the CPB removal time of the first decoding unit of access unit n (containing the current picture) and proceeds as follows.

The decoding process for reference picture set as specified in subclause 8.3.2 is invoked.

If the current picture is an IDR or a BLA picture, the following applies:
1. When the IDR or BLA picture is not the first picture decoded and the value of pic_width_in_luma_samples or pic_height_in_luma_samples or sps_max_dec_pic_buffering[TargetDecHighestTid] derived from the active sequence parameter set is different from the value of pic_width_in_luma_samples or pic_height_in_luma_samples or sps_max_dec_pic_buffering[TargetDecHighestTid] derived from the sequence parameter set that was active for the preceding picture, respectively, no_output_of_prior_pics_flag is inferred to be equal to 1 by the HRD, regardless of the actual value of no_output_of_prior_pics_flag.
   NOTE—Decoder implementations should try to handle picture or DPB size changes more gracefully than the HRD in regard to changes in pic_width_in_luma_samples, pic_height_in_luma_samples, or sps_max_dec_pic_buffering[TargetDecHighestTid].
2. When no_output_of_prior_pics_flag is equal to 1 or is inferred to be equal to 1, all picture storage buffers in the DPB are emptied without output of the pictures they contain, and DPB fullness is set to 0.

All pictures k in the DPB, for which both of the following conditions are true, are removed from the DPB:
picture k is marked as "unused for reference",
picture k has PicOutputFlag equal to 0 or its DPB output time is less than or equal to the CPB removal time of the first decoding unit (denoted as decoding unit m) of the current picture n; i.e. $t_{o,dpb}(k) <= t_r(m)$ When a picture is removed from the DPB, the DPB fullness is decremented by one.

As indicated elsewhere in this disclosure, the parameters sps_max_dec_pic_buffering[i] may not be properly selected in HRD operations. HEVC Working Draft 8 merely indicates sps_max_dec_pic_buffering[i] instead of sps_max_dec_pic_buffering[TargetDecHighestTid], as shown above. HEVC Working Draft 8 does not indicate the semantics of the index i in section C.2.1. Specifying TargetDecHighestTid as the index i of sps_max_dec_pic_buffering[i] may, in accordance with one or more techniques of this disclosure, ensure that i equal to the clearly-specified value of TargetDecHighestTid is used in sps_max_dec_pic_buffering[i] when performing the HRD operation of removing pictures from the DPB.

As shown in the above modifications to section C.2.1 of HEVC Working Draft 8, a device may decode, from an SPS active for a current picture, a first array of syntax elements (sps_max_dec_pic_buffering[ ]) that each indicate a maximum required size of a DPB of the HRD. In addition, the device may decode, from an SPS active for a preceding picture, a second array of syntax elements (sps_max_dec_pic_buffering[ ]) that each indicate a maximum required size of the DPB of the HRD. The device may determine, based on the target highest temporal identifier (TargetDecHighestTid), a first syntax element in the first array (sps_max_dec_pic_buffering[TargetDecHighestTid]). In addition, the device may determine, based on the target highest temporal identifier, a second syntax element in the second array (sps_max_dec_pic_buffering[TargetDecHighestTid]). When the current picture is an instantaneous decoding refresh (IDR) picture or a broken link access (BLA) picture and a value of the first syntax element is different than a value of the second syntax element, the device may infer a value of a third syntax element (no_output_of_prior_pics_flag) regardless of a value indicated by the third syntax element. The third syntax element may specify how previously-decoded pictures in the DPB are treated after decoding of an IDR picture or BLA picture.

An IDR picture may be a random access point (RAP) picture for which each slice segment has a nal_unit_type equal to IDR_W_LP or IDR_N_LP. An IDR picture contains only I slices, and may be the first picture in the bitstream in decoding order, or may appear later in the bitstream. An IDR picture having nal_unit_type equal to IDR_N_LP does not have associated leading pictures present in the bitstream. A leading picture is a picture that precedes the associated RAP picture in output order. An IDR picture having nal_unit_type equal to IDR_W_LP does not have associated tagged-for-discard (TFD) pictures present in the bitstream, but may have associated DLP pictures in the bitstream.

A BLA picture is a RAP picture for which each slice segment has nal_unit_type equal to BLA_W_TFD, BLA_W_DLP or BLA_N_LP. A BLA picture having nal_unit_type equal to BLA_W_TFD may have associated TFD pictures present in the bitstream. A BLA picture having nal_unit_type equal to BLA_N_LP does not have associated leading pictures present in the bitstream. A BLA picture having nal_unit_type equal to BLA_W_DLP does not have associated TFD pictures present in the bitstream, but may have associated DLP pictures in the bitstream.

Section C.3 of HEVC Working Draft 8 describes bitstream conformance operations. In accordance with one or more example techniques of this disclosure, section C.3 of HEVC Working Draft 8 may be modified as follows:

A bitstream of coded data conforming to this Specification shall fulfill all requirements specified in this subclause.

The bitstream shall be constructed according to the syntax, semantics, and constraints specified in this Specification outside of this annex.

The first coded picture in a bitstream shall be a RAP picture, i.e. an IDR picture, a CRA picture, or a BLA picture.

For each current picture that is decoded, let the variables maxPicOrderCnt and minPicOrderCnt be set equal to the maximum and the minimum, respectively, of the PicOrderCntVal values of the following pictures:

The current picture.

The previous picture in decoding order that has TemporalId equal to 0.

The short-term reference pictures in the reference picture set of the current picture.

All pictures n that have PicOutputFlag equal to 1 and $t_r(n) < t_r(currPic)$ and $t_{o,dpb}(n) >= t_r(currPic)$, where currPic is the current picture.

All of the following conditions shall be fulfilled for each of the bitstream conformance tests:

1. For each access unit n, with n>0, associated with a buffering period SEI message, with $\Delta t_{g,90}(n)$ specified by $$\Delta t_{g,90}(n) = 90000 * (t_{r,n}(n) - t_{af}(n-1)) \quad \text{(C-18)}$$

the value of InitCpbRemovalDelay[SchedSelIdx] shall be constrained as follows.

If cbr_flag[SchedSelIdx] is equal to 0, $$\text{InitCpbRemovalDelay[SchedSelIdx]} <= \text{Ceil}(\Delta t_{g,90}(n)) \quad \text{(C-19)}$$

Otherwise (cbr_flag[SchedSelIdx] is equal to 1), $$\text{Floor}(\Delta t_{g,90}(n)) <= \text{InitCpbRemovalDelay[SchedSelIdx]} <= \text{Ceil}(\Delta t_{g,90}(n)) \quad \text{(C-20)}$$

NOTE 4—The exact number of bits in the CPB at the removal time of each picture may depend on which buffering period SEI message is selected to initialize the HRD. Encoders must take this into account to ensure that all specified constraints must be obeyed regardless of which buffering period SEI message is selected to initialize the HRD, as the HRD may be initialized at any one of the buffering period SEI messages.

2. A CPB overflow is specified as the condition in which the total number of bits in the CPB is larger than the CPB size. The CPB shall never overflow.

3. A CPB underflow is specified as the condition in which the nominal CPB removal time of decoding unit m $t_{r,n}(m)$ is less than the final CPB arrival time of decoding unit m $t_{af}(m)$ for at least one value of m. When low_delay_hrd_flag is equal to 0, the CPB shall never underflow.

4. When low_delay_hrd_flag is equal to 1, a CPB underflow may occur at decoding unit m. In this case, the final CPB arrival time of access unit n containing decoding unit m $t_{af}(n)$ shall be greater than the nominal CPB removal time of access unit n containing decoding unit m $t_{r,n}(n)$.

5. The nominal removal times of pictures from the CPB (starting from the second picture in decoding order), shall satisfy the constraints on $t_{r,n}(n)$ and $t_r(n)$ expressed in subclauses A.4.1 through A.4.2.

6. For each current picture that is decoded, after invocation of the process for removal of pictures from the DPB as specified in subclause C.3.1, the number of decoded pictures in the DPB, including all pictures n that are marked as "used for reference" or that have PicOutputFlag equal to 1 and $t_{o,dpb}(n) >= t_r(currPic)$, where currPic is the current picture, shall be less than or equal to Max(0, sps_max_dec_pic_buffering[TargetDecHighestTid]−1).

7. All reference pictures shall be present in the DPB when needed for prediction. Each picture that has OutputFlag equal to 1 shall be present in the DPB at its DPB output time unless it is removed from the DPB before its output time by one of the processes specified in subclause C.3.

8. For each current picture that is decoded, the value of maxPicOrderCnt−minPicOrderCnt shall be less than MaxPicOrderCntLsb/2.

9. The value of $\Delta_{to,dpb}(n)$ as given by Equation C-17, which is the difference between the output time of a picture and that of the first picture following it in output order and having PicOutputFlag equal to 1, shall satisfy the constraint expressed in subclause A.4.1 for the profile, tier and level specified in the bitstream using the decoding process specified in clauses 2-9.

As indicated elsewhere in this disclosure, the parameters sps_max_dec_pic_buffering[i] may not be properly selected in bitstream conformance operations. In item 6 of section C.3, HEVC Working Draft 8 indicates that "the number of decoded pictures in the DPB . . . shall be less than or equal to Min(0, sps_max_dec_pic_buffering[TemporalId]−1)," where TemporalId is not defined. Specifying TargetDecHighestTid as the index i of sps_max_dec_pic_buffering[i] may, in accordance with one or more techniques of this disclosure, ensure that i equal to the clearly-specified value of TargetDecHighestTid is used in sps_max_dec_pic_buffering[i] when performing the bitstream conformance operations.

When a device performs a decoding process as part of a HRD operation, the device may decode, from a SPS, an array of syntax elements (sps_max_dec_pic_buffering[ ]), that each indicate a maximum required size of a DPB of the HRD. Furthermore, as part of performing the HRD operation, the device may determine, based on the target highest temporal identifier (TargetDecHighestTid), a particular syntax element in the array. Furthermore, as shown in the above modifications to section C.3 of HEVC Working Draft 8, the device may determine, based at least in part on whether a number of decoded pictures in the DPB is less than or equal to the maximum of 0 and a value of the particular syntax element minus 1, whether the bitstream conforms to the video coding standard.

Section C.4 of HEVC Working Draft 8 describes decoder conformance. In accordance with one or more example techniques of this disclosure, section C.4 of HEVC Working Draft 8 may be changed as follows:

A decoder conforming to this Specification shall fulfill all requirements specified in this subclause.

A decoder claiming conformance to a specific profile, tier and level shall be able to successfully decode all bitstreams that conform to the bitstream conformance requirements specified in subclause C.4, in the manner specified in Annex A, provided that all video parameter sets, sequence parameter sets, and picture parameter sets referred to in the VCL NAL units, and appropriate buffering period and picture timing SEI messages are conveyed to the decoder, in a timely manner, either in the bitstream (by non-VCL NAL units), or by external means not specified by this Specification.

When a bitstream contains syntax elements that have values that are specified as reserved and it is specified that decoders shall ignore values of the syntax elements or NAL units containing the syntax elements having the reserved values, and the bitstream is otherwise conforming to this Specification, a conforming decoder shall decode the bitstream in the same manner as it would decode a conforming bitstream and ignore values of the syntax elements or NAL units containing the syntax elements having the reserved values as specified.

There are two types of conformance that can be claimed by a decoder: output timing conformance and output order conformance.

To check conformance of a decoder, test bitstreams conforming to the claimed profile, tier and level, as specified by subclause C.4 are delivered by a hypothetical stream scheduler (HSS) both to the HRD and to the decoder under test (DUT). All pictures output by the HRD shall also be output by the DUT and, for each picture output by the HRD, the values of all samples that are output by the DUT for the corresponding picture shall be equal to the values of the samples output by the HRD.

For output timing decoder conformance, the HSS operates as described above, with delivery schedules selected only from the subset of values of SchedSelIdx for which the bit rate and CPB size are restricted as specified in Annex A for the specified profile, tier and level, or with "interpolated" delivery schedules as specified below for which the bit rate and CPB size are restricted as specified in Annex A. The same delivery schedule is used for both the HRD and DUT.

When the HRD parameters and the buffering period SEI messages are present with cpb_cnt_minus1[TargetDecHighestTid] greater than 0, the decoder shall be capable of decoding the bitstream as delivered from the HSS operating using an "interpolated" delivery schedule specified as having peak bit rate r, CPB size c(r), and initial CPB removal delay (f(r)÷r) as follows:

$$\alpha=(r-\text{BitRate}[\text{SchedSelIdx}-1])\div(\text{BitRate}[\text{SchedSelIdx}]-\text{BitRate}[\text{SchedSelIdx}-1]), \quad \text{(C-22)}$$

$$c(r)=\alpha*\text{CpbSize}[\text{SchedSelIdx}]+(1-\alpha)*\text{CpbSize}[\text{SchedSelIdx}-1], \quad \text{(C-23)}$$

$$f(r)=\alpha*\text{InitCpbRemovalDelay}[\text{SchedSelIdx}]*\text{BitRate}[\text{SchedSelIdx}]+(1-\alpha)*\text{InitCpbRemovalDelay}[\text{SchedSelIdx}-1]*\text{BitRate}[\text{SchedSelIdx}-1] \quad \text{(C-24)}$$

for any SchedSelIdx>0 and r such that BitRate[SchedSelIdx-1]<=r<=BitRate[SchedSelIdx] such that r and c(r) are within the limits as specified in Annex A for the maximum bit rate and buffer size for the specified profile, tier and level.

NOTE 1—InitCpbRemovalDelay[SchedSelIdx] can be different from one buffering period to another and have to be re-calculated.

For output timing decoder conformance, an HRD as described above is used and the timing (relative to the delivery time of the first bit) of picture output is the same for both HRD and the DUT up to a fixed delay.

For output order decoder conformance, the following applies.

The HSS delivers the bitstream BitstreamToDecode to the DUT "by demand" from the DUT, meaning that the HSS delivers bits (in decoding order) only when the DUT requires more bits to proceed with its processing.

NOTE 2—This means that for this test, the coded picture buffer of the DUT could be as small as the size of the largest decoding unit.

A modified HRD as described below is used, and the HSS delivers the bitstream to the HRD by one of the schedules specified in the bitstream BitstreamToDecode such that the bit rate and CPB size are restricted as specified in Annex A. The order of pictures output shall be the same for both HRD and the DUT.

For output order decoder conformance, the CPB size is CpbSize[SchedSelIdx] as specified by Equation E-46, where SchedSelIdx and the HRD parameters are selected as specified above in subclause C.1. The DPB size is sps_max_dec_pic_buffering[TargetDecHighestTid]. Removal time from the CPB for the HRD is equal to final bit arrival time and decoding is immediate. The operation of the DPB of this HRD is as described in subclauses C.5.1 through C.5.3.

As indicated elsewhere in this disclosure, the parameters cpb_cnt_minus1[i] and sps_max_dec_pic_buffering[i] may not be properly selected in decoder conformance requirements. For instance, section C.4 of HEVC Working Draft 8 does not specify an index for cpb_cnt_minus1. Specifying TargetDecHighestTid as the index i of cpb_cnt_minus1[i] and sps_max_dec_pic_buffering[i] may, in accordance with one or more techniques of this disclosure, ensure that decoder conformance operations are consistently performed with i equal to the clearly-specified value of TargetDecHighestTid.

Furthermore, section C.4.2 of HEVC Working Draft 8 describes removal of pictures from the DPB for decoder conformance. In accordance with one or more example techniques of this disclosure, the title of section C.4.2 may be changed from "removal of pictures from the DPB" to "output and removal of pictures from the DPB." The text of section C.4.2 of HEVC Working Draft 8 may be changed as follows:

The output and removal of pictures from the DPB before decoding of the current picture (but after parsing the slice header of the first slice of the current picture) happens instantaneously when the first decoding unit of the access unit containing the current picture is removed from the CPB and proceeds as follows.

The decoding process for reference picture set as specified in subclause 8.3.2 is invoked.

If the current picture is an IDR or a BLA picture, the following applies.

1. When the IDR or BLA picture is not the first picture decoded and the value of pic_width_in_luma_samples or pic_height_in_luma_samples or sps_max_dec_pic_buffering[TargetDecHighestTid] derived from the active sequence parameter set is different from the value of pic_width_in_luma_samples or pic_height_in_luma_samples or sps_max_dec_pic_buffering[TargetDecHighestTid] derived from the sequence parameter set that was active for the preceding picture, respectively, no_output_of_prior_pics_flag is inferred to be equal to 1 by the HRD, regardless of the actual value of no_output_of_prior_pics_flag.

NOTE—Decoder implementations should try to handle picture or DPB size changes more gracefully than the HRD in regard to changes in pic_width_in_luma_samples, pic_height_in_luma_samples or sps_max_dec_pic_buffering [TargetDecHighestTid].

2. When no_output_of_prior_pics_flag is equal to 1 or is inferred to be equal to 1, all picture storage buffers in the DPB are emptied without output of the pictures they contain.

3. When no_output_of_prior_pics_flag is not equal to 1 and is not inferred to be equal to 1, picture storage buffers containing a picture that is marked as "not needed for output" and "unused for reference" are emptied (without output), and all non-empty picture storage buffers in the DPB are emptied by repeatedly invoking the "bumping" process specified in subclause C.5.2.1.

Otherwise (the current picture is not an IDR or a BLA picture), picture storage buffers containing a picture which are marked as "not needed for output" and "unused for reference" are emptied (without output). When one or more of the following conditions are true, the "bumping" process specified in subclause C.5.2.1 is invoked repeatedly until there is an empty picture storage buffer to store the current decoded picture.

1. The number of pictures in the DPB that are marked as "needed for output" is greater than sps_max_num_reorder_pics[TargetDecHighestTid].

2. The number of pictures in the DPB is equal to sps_max_dec_pic_buffering[TargetDecHighestTid].

"Bumping" Process

The "bumping" process is invoked in the following cases.

The current picture is an IDR or a BLA picture and no_output_of_prior_pics_flag is not equal to 1 and is not inferred to be equal to 1, as specified in subclause C.5.2.

The current picture is not an IDR or a BLA picture, and the number of pictures in the DPB that are marked "needed for output" is greater than sps_max_num_reorder_pics[TargetDecHighestTid], as specified in subclause C.5.2.

The current picture is not an IDR or a BLA picture and the number of pictures in the DPB is equal to sps_max_dec_pic_buffering[TargetDecHighestTid], as specified in subclause C.5.2.

The "bumping" process consists of the following ordered steps:

1. The picture that is first for output is selected as the one having the smallest value of PicOrderCntVal of all pictures in the DPB marked as "needed for output".

2. The picture is cropped, using the cropping rectangle specified in the active sequence parameter set for the picture, the cropped picture is output, and the picture is marked as "not needed for output".

3. If the picture storage buffer that included the picture that was cropped and output contains a picture marked as "unused for reference", the picture storage buffer is emptied.

As indicated elsewhere in this disclosure, the parameters sps_max_dec_pic_buffering[i] and sps_max_num_reorder_pics[i] may not be properly selected in HRD operations, such as removal of pictures from the DPB. Specifying TargetDecHighestTid as the index i of sps_max_dec_pic_buffering[i] and sps_max_num_reorder_pics[i] may, in accordance with one or more techniques of this disclosure, ensure that i equal to the clearly-specified value of TargetDecHighestTid is used in sps_max_dec_pic_buffering[i] and sps_max_num_reorder_pics[i] when performing the HRD operation of removing pictures from the DPB.

When a device performs a decoding process during an HRD operation, the device may decode, from a SPS, an array of syntax elements (sps_max_dec_pic_buffering[ ]) that each indicate a maximum required size of a DPB of the HRD. Furthermore, when the device performs the HRD operation, the device may determine, based on the target highest temporal identifier, a particular syntax element in the array (sps_max_dec_pic_buffering[TargetDecHighestTid]). Furthermore, the device may perform a bumping process that empties one or more picture storage buffers of the DPB when a current picture is not an IDR picture or a BLA picture and the number of pictures in the DPB marked as needed for output is greater than a value of the particular syntax element.

Similarly, when a device performs a decoding process during an HRD operation, the device may decode, from a SPS, an array of syntax elements (sps_max_dec_pic_buffering[ ]) that each indicate a maximum required size of a DPB of the HRD. Furthermore, when the device performs the HRD operation, the device may determine, based on the target highest temporal identifier, a particular syntax element in the array (sps_max_dec_pic_buffering[TargetDecHighestTid]). Furthermore, the device may perform a bumping process that empties one or more picture storage buffers of the DPB when a current picture is not an IDR picture or a BLA picture and the number of pictures in the DPB is equal indicated by the particular syntax element.

Furthermore, in accordance with one or more techniques of this disclosure, an applicable_operation_points( ) syntax structure and associated semantics may be added to HEVC Working Draft 8. Table 5, below, shows an example syntax of the applicable_operation_points( ) syntax structure.

TABLE 5

| Applicable Operation Points | |
|---|---|
| applicable_operation_points( ) { | |
|   num_applicable_ops_minus1 | ue(v) |
|   if( num_applicable_ops_minus1 > 0) | |
|     default_op_applicable_flag | u(1) |
|   mumOpsSignalled = default_op_applicable_flag ? | |
|       num_applicable_ops_minus1 : | |
|       num_applicable_ops_minus1 + 1 | |
|   for( i = 0; i < mumOpsSignalled; i++ ) { | |
|     operation_point_layer_ids( i ) | |
|     op_temporal_id[ i ] | u(3) |
|   } | |
| } | |

The applicable_operation_point( ) syntax structure shown in Table 5 specifies the operation points to which the SEI message associated with this syntax structure applies. The SEI message associated with an applicable_operation_point ( ) syntax structure (also referred to as the associated SEI message) is the SEI message that contains the applicable_operation_point( ) syntax structure. The SEI message associated with an applicable_operation_point( ) syntax structure may be a buffering period SEI message, a picture timing SEI message or a sub-picture timing SEI message.

A default operation point may be defined as the operation point identified by OpLayerIdSet containing values 0 to nuh_reserved_zero_6bits, inclusive, where nuh_reserved_zero_6bits is coded in the NAL unit header of the SEI NAL unit containing the associated SEI message, and OpTid is equal to the TemporalId value of the SEI NAL unit containing the associated SEI message. Alternatively, the default operation point may be defined as the operation point identified by the OpLayerIdSet containing only the nuh_reserved_zero_6bits in the NAL unit header of the SEI NAL unit containing the associated SEI message, and OpTid is equal to the TemporalId value of the SEI NAL unit containing the associated SEI message. Alternatively, the default operation point may be defined as the operation point identified by the OpLayerIdSet containing only the value 0, and OpTid is equal to the TemporalId value of the SEI NAL unit containing the associated SEI message.

If default_op_applicable_flag is equal to 1, the operation points to which the associated SEI message applies are the default operation point and the num_applicable_ops_minus1 operation points identified by OpLayerIdSet as specified by operation_point_layer_ids(i) and OpTid equal to op_temporal_id[i], with i in the range of 0 to num_applicable_ops_minus1, inclusive. Otherwise (default_op_applicable_flag is equal to 0), the operation points to which the associated SEI message applies may be the num_applicable_ops_minus1+1 operation points identified by OpLayerIdSet as specified by operation_point_layer_ids(i) and OpTid equal to op_temporal_id[i], with i in the range of 0 to num_applicable_ops_minus1+1, inclusive.

Furthermore, in the example syntax of Table 5, the num_applicable_ops_minus1 syntax element, plus 1, specifies the number of operation points to which the associated SEI message applies. The value of num_applicable_ops_minus1 may be in the range of 0 to 63, inclusive. In the example of Table 5, the default_op_applicable_flag syntax element equal to 1 specifies that the associated SEI message applies to the default operation point. The default_op_applicable_flag syntax element equal to 0 specifies that the associated SEI message does not apply to the default operation point. The op_temporal_id[i] syntax element specifies the i-th OpTid value explicitly signaled in the applicable_operation_point( ) syntax structure. The value of op_temporal_id[i] may be in the range of 0 to 6, inclusive.

As indicated above, HEVC Working Draft 8 provides no way to associate a buffering period SEI message or picture timing SEI message to a hrd_parameters( ) syntax structure for which the associated operation_point_layer_ids( ) syntax structure includes multiple values of nuh_reserved_zero_6bits (i.e., multiple layer IDs in a multiview, 3DV or scalable video coding extension of HEVC). The inclusion of the applicable_operation_point( ) syntax structure may at least partially resolve this problem. The applicable_operation_point( ) syntax structure may clearly specify the operation points to which a buffering period SEI message, a picture timing SEI message or a sub-picture timing SEI message applies. This may allow the use of information carried in the syntax elements nuh_reserved_zero_6bits and temporal_id_plus1 in the NAL unit header of SEI NAL units, and may allow the sharing of the information conveyed in a same buffering period, picture timing or sub-picture timing SEI message for processing of video data associated with multiple operation points.

Section D.1.1 of HEVC Working Draft 8 describes the syntax of buffering period SEI messages. In accordance with one or more example techniques of this disclosure, the buffering period SEI message syntax may be changed as shown in Table 6, below. The changes to the buffering period SEI message syntax may enable buffering period SEI messages to include applicable_operation_points( ) syntax structures.

TABLE 6

| Buffering Period | Descriptor |
|---|---|
| Buffering_period( payloadSize ) { | |
|   seq_parameter_set_id | ue(v) |
|   applicable_operation_points( ) | |
|   if( !sub_pic_cpb_params_present_flag ) | |
|     rap_cpb_params_present_flag | u(1) |
|   if( NalHrdBpPresentFlag ) { | |
|     for( SchedSelIdx = 0; SchedSelIdx < CpbCnt; SchedSelIdx++ ) | |
|     { | |
|       initial_cpb_removal_delay[ SchedSelIdx ] | u(v) |
|       initial_cpb_removal_delay_offset[ SchedSelIdx ] | u(v) |
|       if( sub_pic_cpb_params_present_flag \|\| rap_cpb_params_present_flag ) { | |
|         initial_alt_cpb_removal_delay[ SchedSelIdx ] | u(v) |
|         initial_alt_cpb_removal_delay_offset[ SchedSelIdx ] | u(v) |
|       } | |
|     } | |
|   } | |
|   if( VclHrdBpPresentFlag ) { | |
|     for( SchedSelIdx = 0; SchedSelIdx < CpbCnt; SchedSelIdx++ ) | |
|     { | |
|       initial_cpb_removal_delay[ SchedSelIdx ] | u(v) |
|       initial_cpb_removal_delay_offset[ SchedSelIdx ] | u(v) |
|       if( sub_pic_cpb_params_present_flag \|\| rap_cpb_params_present_flag) { | |
|         initial_alt_cpb_removal_delay[ SchedSelIdx ] | u(v) |
|         initial_alt_cpb_removal_delay_offset[ SchedSelIdx ] | u(v) |
|       } | |
|     } | |
|   } | |
| } | |

Section D.2.1 of HEVC Working Draft 8 describes the semantics of the syntax elements of buffering period SEI messages. In accordance with one or more techniques of this disclosure, the semantics of the buffering_period(payloadSize) syntax structure may be changed as follows. Semantics for those syntax elements not mentioned are the same as in HEVC Working Draft 8.

A buffering period SEI message provides information of initial CPB removal delay and initial CPB removal delay offset.

The following applies for the buffering period SEI message syntax and semantics:

The syntax elements initial_cpb_removal_delay_length_minus1 and sub_pic_cpb_params_present_flag, and the variables NalHrdBpPresentFlag, VclHrdBpPresentFlag, CpbSize[SchedSelIdx], BitRate[SchedSelIdx], and CpbCnt are found in or derived from syntax elements found in the hrd_parameters( ) syntax structure and the sub_layer_hrd_parameters( ) syntax structure applicable to any of the operation points that the buffering period SEI message applies to.

Any two operation points that the buffering period SEI message applies to having different OpTid values tIdA and tIdB indicates that the values of cpb_cnt_ minus1[tIdA] and cpb_cnt_minus1[tIdB] coded in the hrd_parameters( ) syntax structure(s) applicable to the two operation points are identical.

Any two operation points that the buffering period SEI message applies to having different OpLayerIdSet values layerIdSetA and layerIdSetB indicates that the values of nal_hrd_parameters_present_flag and vcl_hrd_parameters_present_flag, respectively, for the two hrd_parameters( ) syntax structures applicable to the two operation points are identical.

The bitstream (or a part thereof) refers to the bitstream subset (or a part thereof) associated with any of the operation points the buffering period SEI message applies to.

If NalHrdBpPresentFlag or VclHrdBpPresentFlag are equal to 1, a buffering period SEI message applicable to the specified operation points may be present in any access unit in the coded video sequence, and a buffering period SEI message applicable to the specified operation points shall be present in each RAP access unit, and in each access unit associated with a recovery point SEI message. Otherwise (NalHrdBpPresentFlag and VclHrdBpPresentFlag are both equal to 0), no access unit in the coded video sequence shall have a buffering period SEI message applicable to the specified operation points.

NOTE—For some applications, frequent presence of a buffering period SEI message may be desirable.

When an SEI NAL unit that contains a buffering period SEI message and has nuh_reserved_zero_6bits equal to 0 is present, the SEI NAL unit shall precede, in decoding order, the first VCL NAL unit in the access unit.

A buffering period is specified as the set of access units between two instances of the buffering period SEI message consecutive in decoding order.

The variable CpbCnt is derived to be equal to cpb_cnt_minus1[tId]+1, where cpb_cnt_minus1[tId] is coded in the hrd_parameters( ) syntax structure that is applicable to any of the operation points that the buffering period SEI message applies to and that have OpTid equal to tId.

seq_parameter_set_id refers to the active sequence parameter set. The value of seq_parameter_set_id shall be equal to the value of seq_parameter_set_id in the picture parameter set referenced by the coded picture associated with the buffering period SEI message. The value of seq_parameter_set_id shall be in the range of 0 to 31, inclusive.

rap_cpb_params_present_flag equal to 1 specifies the presence of the initial_alt_cpb_removal_delay[SchedSelIdx] and initial_alt_cpb_removal_delay_offset[SchedSelIdx] syntax elements. When not present, the value of alt_cpb_params_present_flag is inferred to be equal to 0. When the associated picture is neither a CRA picture nor a BLA picture, the value of alt_cpb_params_present_flag shall be equal to 0.

initial_cpb_removal_delay[SchedSelIdx] and initial_alt_cpb_removal_delay[SchedSelIdx] specify the default and the alternative initial CPB removal delays, respectively, for the SchedSelIdx-th CPB. The syntax elements have a length in bits given by initial_cpb_removal_delay_length_minus1+1, and are in units of a 90 kHz clock. The values of the syntax elements shall not be equal to 0 and shall be less than or equal to 90000*(CpbSize[SchedSelIdx]÷BitRate[SchedSelIdx]), the time-equivalent of the CPB size in 90 kHz clock units.

initial_cpb_removal_delay_offset[SchedSelIdx] and initial_alt_cpb_removal_delay_offset[SchedSelIdx] specify the default and the alternative initial CPB removal offsets, respectively, for the SchedSelIdx-th CPB. The syntax elements have a length in bits given by initial_cpb_removal_delay_length_minus1+1 and are in units of a 90 kHz clock. These syntax elements are not used by decoders and may be needed only for the delivery scheduler (HSS) specified in Annex C.

The buffering period SEI message may include HRD parameters (e.g., initial_cpb_removal_delay[SchedSelIdx], initial_cpb_removal_delay_offset[SchedSelIdx], initial_alt_cpb_removal_delay[SchedSelIdx] and initial_alt_cpb_removal_delay_offset[SchedSelIdx]). As indicated above, HEVC Working Draft 8 provides no way to associate a buffering period SEI message to a hrd_parameters( ) syntax structure in a VPS for which the associated operation_point_layer_ids( ) syntax structure includes multiple values of nuh_reserved_zero_6bits (i.e. multiple layer IDs in a multiview, 3DV or scalable video coding extension of HEVC). Hence, in accordance with one or more techniques of this disclosure, the applicable_operation_points( ) syntax element in the buffering period SEI message specifies the operation points to which the buffering period SEI message applies.

Section D.1.2 of HEVC Working Draft 8 indicates the syntax of picture timing SEI messages. In accordance with one or more techniques of this disclosure, the syntax of the picture timing SEI message may be changed as shown in Table 7, below. The changes to the picture timing SEI message syntax may enable picture timing SEI messages to include applicable_operation_points( ) syntax structures.

TABLE 7

Picture Timing SEI Message

| pic_timing( payloadSize ) { | Descriptor |
|---|---|
|   applicable_operation_points( ) | |
|   au_cpb_removal_delay_minus1 | u(v) |
|   pic_dpb_output_delay | u(v) |
|   if( sub_pic_cpb_params_present_flag ) { | |
|     num_decoding_units_minus1 | ue(v) |
|     du_common_cpb_removal_delay_flag | u(1) |
|     if( du_common_cpb_removal_delay_flag ) | |
|       du_common_cpb_removal_delay_minus1 | u(v) |
|     for( i = 0; i <= num_decoding_units_minus1; i++ ) { | |
|       num_nalus_in_du_minus1[ i ] | ue(v) |
|       if( !du_common_cpb_removal_delay_flag ) | |
|         du_cpb_removal_delay_minus1[ i ] | u(v) |
|     } | |
|   } | |
| } | |

In addition, the semantics of the picture timing SEI message may be changed as follows. Semantics for those syntax elements of the pic_timing(payloadSize) syntax structure not mentioned below may be the same as those in HEVC Working Draft 8.

The picture timing SEI message provides information of CPB removal delay and DPB output delay for the access unit associated with the SEI message. The following applies for the picture timing SEI message syntax and semantics:

The syntax elements sub_pic_cpb_params_present_flag, cpb_removal_delay_length_minus1, dpb_output_delay_length_minus1, and du_cpb_removal_delay_length_minus1, and the variable CpbDpbDelaysPresentFlag are found in or derived from syntax elements found in the hrd_parameters( ) syntax structure and the sub_layer_hrd_parameters ( ) syntax structure applicable to any of the operation points that the picture timing SEI message applies to.

The bitstream (or a part thereof) refers to the bitstream subset (or a part thereof) associated with any of the operation points the picture timing SEI message applies to.

NOTE 1—The syntax of the picture timing SEI message is dependent on the content of the hrd_parameters( ) syntax structures applicable to the operation points the picture timing SEI message applies to. These hrd_parameters( ) syntax structures are in the video parameter set and/or the sequence parameter set that are active for the coded picture associated with the picture timing SEI message. When the picture timing SEI message is associated with a CRA access unit that is the first access unit in the bitstream, an IDR access unit, or a BLA access unit, unless it is preceded by a buffering period SEI message within the same access unit, the activation of the video parameter set and sequence parameter set (and, for IDR or BLA pictures that are not the first picture in the bitstream, the determination that the coded picture is an IDR picture or a BLA picture) does not occur until the decoding of the first coded slice NAL unit of the coded picture. Since the coded slice NAL unit of the coded picture follows the picture timing SEI message in NAL unit order, there may be cases in which it is necessary for a decoder to store the RBSP containing the picture timing SEI message until determining the active video parameter set and/or the active sequence parameter set, and then perform the parsing of the picture timing SEI message.

The presence of picture timing SEI message in the bitstream is specified as follows.

If CpbDpbDelaysPresentFlag is equal to 1, one picture timing SEI message applicable to the specified operation points shall be present in every access unit of the coded video sequence.

Otherwise (CpbDpbDelaysPresentFlag is equal to 0), no picture timing SEI messages applicable to the specified operation points shall be present in any access unit of the coded video sequence.

When an SEI NAL unit that contains a picture timing SEI message and has nuh_reserved_zero_6bits equal to 0 is present, the SEI NAL unit shall precede, in decoding order, the first VCL NAL unit in the access unit.

au_cpb_removal_delay_minus1 plus 1 specifies, when the HRD operates at access unit level, how many clock ticks to wait after removal from the CPB of the access unit associated with the most recent buffering period SEI message in a preceding access unit before removing from the buffer the access unit data associated with the picture timing SEI message. This value is also used to calculate an earliest possible time of arrival of access unit data into the CPB for the HSS. The syntax element is a fixed length code whose length in bits is given by cpb_removal_delay_length_minus1+1.

NOTE 2—The value of cpb_removal_delay_length_minus1 that determines the length (in bits) of the syntax element au_cpb_removal_delay_minus1 is the value of cpb_removal_delay_length_minus1 coded in the video parameter set or the sequence parameter set that is active for the coded picture associated with the picture timing SEI message, although au_cpb_removal_delay_minus1 plus 1 specifies a number of clock ticks relative to the removal time of the preceding access unit containing a buffering period SEI message, which may be an access unit of a different coded video sequence.

pic_dpb_output_delay is used to compute the DPB output time of the picture. It specifies how many clock ticks to wait after removal of the last decoding unit in an access unit from the CPB before the decoded picture is output from the DPB.

NOTE 3—A picture is not removed from the DPB at its output time when it is still marked as "used for short-term reference" or "used for long-term reference".

NOTE 4—Only one pic_dpb_output_delay is specified for a decoded picture.

The length of the syntax element pic_dpb_output_delay is given in bits by dpb_output_delay_length_minus1+1. When sps_max_dec_pic_buffering[minTid] is equal to 1, where minTid is the minimum of the OpTid values of all operation points the picture timing SEI message applies to, pic_dpb_output_delay shall be equal to 0.

The output time derived from the pic_dpb_output_delay of any picture that is output from an output timing conforming decoder shall precede the output time derived from the pic_dpb_output_delay of all pictures in any subsequent coded video sequence in decoding order.

The picture output order established by the values of this syntax element shall be the same order as established by the values of PicOrderCntVal.

For pictures that are not output by the "bumping" process because they precede, in decoding order, an IDR or BLA picture with no_output_of_prior_pics_flag equal to 1 or inferred to be equal to 1, the output times derived from pic_dpb_output_delay shall be increasing with increasing value of PicOrderCntVal relative to all pictures within the same coded video sequence.

du_common_cpb_removal_delay_flag equal to 1 specifies that the syntax element du_common_cpb_removal_delay_minus1 is present. du_common_cpb_removal_delay_flag equal to 0 specifies that the syntax element du_common_cpb_removal_delay_minus1 is not present.

du_common_cpb_removal_delay_minus1 plus 1 specifies how many sub-picture clock ticks (see subclause E.2.1) to wait, before removal from the CPB of each decoding unit in the access unit associated with the picture timing SEI message, after removal from the CPB of the previous decoding unit in decoding order. This value is also used to calculate an earliest possible time of arrival of decoding unit data into the CPB for the HSS, as specified in Annex C. The syntax element is a fixed length code whose length in bits is given by du_cpb_removal_delay_length_minus1+1.

As indicated above, HEVC Working Draft 8 provides no way to associate a picture timing SEI message to a hrd_parameters( ) syntax structure in a VPS for which the associated operation_point_layer_ids( ) syntax structure includes multiple values of nuh_reserved_zero_6bits (i.e. multiple layer IDs in a multiview, 3DV or scalable video coding extension of HEVC). Hence, in accordance with one or more techniques of this disclosure, the applicable_operation_ points( ) syntax element in the picture timing SEI message specifies the operation points to which the buffering period SEI message applies.

Furthermore, in accordance with one or more techniques of this disclosure, the syntax of the sub-picture timing SEI message may be changed as shown in Table 8, below. The changes to the sub-picture timing SEI message syntax may enable sub-picture timing SEI messages to include applicable_operation_points( ) syntax structures. In HEVC Working Draft 8, sub-picture timing SEI message do not include the applicable_operation_points( ) syntax structure.

TABLE 8

Sub-Picture Timing SEI Message

| sub_pic_timing( payloadSize ) { | Descriptor |
|---|---|
| applicable_operation_points( ) du_spt_cpb_removal_delay_minus1 } | u(v) |

Section D.2.2.2 of HEVC Working Draft 8 describes the semantics of sub-picture timing SEI messages. In accordance with one or more techniques of this disclosure, section D.2.2.2 of HEVC Working Draft 8 may be modified as follows:

The sub-picture timing SEI message provides CPB removal delay information for the decoding unit associated with the SEI message.

The following applies for the sub picture timing SEI message syntax and semantics:

The syntax elements sub_pic_cpb_params_present_flag and cpb_removal_delay_length_minus1, and the variable CpbDpbDelaysPresentFlag are found in or derived from syntax elements found in the hrd_parameters( ) syntax structure and the sub_layer_hrd_parameters( ) syntax structure applicable to any of the operation points that the sub-picture timing SEI message applies to.

The bitstream (or a part thereof) refers to the bitstream subset (or a part thereof) associated with any of the operation points the sub picture timing SEI message applies to.

The presence of the sub-picture timing SEI message in the bitstream is specified as follows.

If CpbDpbDelaysPresentFlag is equal to 1 and sub_pic_cpb_params_present_flag is equal to 1, one sub-picture timing SEI message applicable to the specified operation points may be present in each decoding unit in the coded video sequence.

Otherwise (CpbDpbDelaysPresentFlag is equal to 0 or sub_pic_cpb_params_present_flag is equal to 0), no sub-picture timing SEI messages applicable to the specified operation points shall be present in the coded video sequence.

The decoding unit associated with a sub-picture timing SEI message consists, in decoding order, of the SEI NAL unit containing the sub-picture timing SEI message, followed by one or more NAL units that do not contain a sub-picture timing SEI message, including all subsequent NAL units in the access unit up to but not including any subsequent SEI NAL unit containing a sub-picture timing SEI message. There shall be at least one VCL NAL unit in each decoding unit. All non-VCL NAL units associated with a VCL NAL unit shall be included in the same decoding unit.

du_spt_cpb_removal_delay_minus1 plus1 specifies how many sub-picture clock ticks to wait after removal from the CPB of the last decoding unit in the access unit associated with the most recent buffering period SEI message in a preceding access unit before removing from the CPB the decoding unit associated with the sub-picture timing SEI message. This value is also used to calculate an earliest possible time of arrival of decoding unit data into the CPB for the HSS, as specified in Annex C. The syntax element is represented by a fixed length code whose length in bits is given by cpb_removal_delay_length_minus1+1.

NOTE—The value of cpb_removal_delay_length_minus1 that determines the length (in bits) of the syntax element du_spt_cpb_removal_delay_minus1 is the value of cpb_removal_delay_length_minus1 coded in the video parameter set or the sequence parameter set that is active for the access unit containing the decoding unit associated with the sub-picture timing SEI message, although du_spt_cpb_removal_delay_minus1 plus 1 specifies a number of sub-picture clock ticks relative to the removal time of the last decoding unit in the preceding access unit containing a buffering period SEI message, which may be an access unit of a different coded video sequence.

Section E.2.2 of HEVC Working Draft 8 describes HRD parameter semantics. In accordance with one or more techniques of this disclosure, section E.2.2 of HEVC Working Draft 8 may be changed as follows. Semantics for those syntax elements of HRD parameters not mentioned below may be the same as those in HEVC Working Draft 8.

The hrd_parameters( ) syntax structure provides HRD parameters used in the HRD operations. When the hrd_parameters( ) syntax structure is included in a video parameter set, the set of number of nuh_reserved_zero_6bits values included in the OpLayerIdSet of the operation points to which the syntax structure applies is either specified by the corresponding operation_point_layer_ids( ) syntax structure in the video parameter set or implicitly derived, as specified in subclause 7.4.4. When the hrd_parameters ( ) syntax structure is included in a sequence parameter set, the applicable operation points are all the operation points with OpLayerIdSet containing only the value 0. Alternatively, when the hrd_parameters( ) syntax structure is included in a sequence parameter set, the applicable operation points are all the operation points with OpLayerIdSet identical to TargetDecLayerIdSet.

It is a requirement of bitstream conformance that for all the hrd_parameters( ) syntax structure in the coded video sequence (either in the video parameter set or the sequence parameter set), there shall not be more than one of them that applies to the same operation point. Alternatively, it is required that there shall not be more than one hrd_parameters( ) syntax structure in a video parameter set that applies to the same operation point. Alternatively, it is required that a video parameter set shall not include a hrd_parameters( ) syntax structure that applies to operation points with OpLayerIdSet containing only the value 0.

du_cpb_removal_delay_length_minus1 plus 1 specifies the length, in bits, of the du_cpb_removal_delay_minus1[i] and du_common_cpb_removal_delay_minus1 syntax elements of the picture timing SEI message.

cpb_removal_delay_length_minus1 plus 1 specifies the length, in bits, of the au_cpb_removal_delay_minus1 syntax element in the picture timing SEI message and the du_spt_cpb_removal_delay_minus1 syntax element in the sub-picture timing SEI message. When the cpb_removal_delay_length_minus1 syntax element is not present, it is inferred to be equal to 23.

dpb_output_delay_length_minus1 plus 1 specifies the length, in bits, of the pic_dpb_output_delay syntax element in the picture timing SEI message. When the dpb_output_delay_length_minus1 syntax element is not present, it is inferred to be equal to 23.

fixed_pic_rate_flag[i] equal to 1 indicates that, when TargetDecHighestTid is equal to i, the temporal distance between the HRD output times of any two consecutive pictures in output order is constrained as follows. fixed_pic_rate_flag[i] equal to 0 indicates that no such constraints apply to the temporal distance between the HRD output times of any two consecutive pictures in output order.

When fixed_pic_rate_flag[i] is not present, it is inferred to be equal to 0. When TargetDecHighestTid is equal to i and fixed_pic_rate_flag[i] is equal to 1 for a coded video sequence containing picture n, the value computed for $\Delta t_{o,dpb}(n)$ as specified in Equation C-17 shall be equal to $t_c*(\text{pic\_duration\_in\_tcs\_minus1}[i]+1)$, wherein $t_c$ is as specified in Equation C-1 (using the value of $t_c$ for the coded video sequence containing picture n) when one or more of the following conditions are true for the following picture nn that is specified for use in Equation C-17:

picture nn is in the same coded video sequence as picture n.

picture nn is in a different coded video sequence and fixed_pic_rate_flag[i] is equal to 1 in the coded video sequence containing picture nn, the value of num_units_in_tick÷time_scale is the same for both coded video sequences, and the value of pic_duration_in_tc_minus1[i] is the same for both coded video sequences.

pic_duration_in_tc_minus1[i] plus 1 specifies, when TargetDecHighestTid is equal to i, the temporal distance, in clock ticks, between the HRD output times of any two consecutive pictures in output order in the coded video sequence. The value of pic_duration_in_tc_minus1[i] shall be in the range of 0 to 2047, inclusive.

low_delay_hrd_flag[i] specifies the HRD operational mode, when TargetDecHighestTid is equal to i, as specified in Annex C. When fixed_pic_rate_flag[i] is equal to 1, low_delay_hrd_flag[i] shall be equal to 0.
NOTE 3—When low_delay_hrd_flag[i] is equal to 1, "big pictures" that violate the nominal CPB removal times due to the number of bits used by an access unit are permitted. It is expected, but not required, that such "big pictures" occur only occasionally.

cpb_cnt_minus1[i] plus 1 specifies the number of alternative CPB specifications in the bitstream of the coded video sequence when TargetDecHighestTid is equal to i. The value of cpb_cnt_minus1[i] shall be in the range of 0 to 31, inclusive. When low_delay_hrd_flag[i] is equal to 1, cpb_cnt_minus1[i] shall be equal to 0. When cpb_cnt_minus1[i] is not present, it is inferred to be equal to 0.

As described elsewhere in this disclosure, in HEVC Working Draft 8, only the hrd_parameters( ) syntax structures in a VPS may be selected for HRD operations while hrd_parameters( ) syntax structures in an SPS are never selected. The changes shown above to the semantics of hrd_parameters( ) syntax structure clarify that when the hrd_parameters( ) syntax structure is included in a SPS, the operation points to which the hrd_parameters( ) syntax structure is applicable may be all operation points with OpLayerIdSet identical to TargetDecLayerIdSet. As indicated above in the modified general decoding process, if an external means is available to set TargetDecLayerIdSet, TargetDecLayerIdSet may be specified by an external means. Otherwise, if the decoding process is invoked in a bitstream conformance test, TargetDecLayerIdSet may be the set of layer identifiers of an operation point under test. Otherwise, TargetDecLayerIdSet may contain only one layer identifier (i.e., only one value of nuh_reserved_zero_6bits), which is equal to 0. In one example, the external means may be an API that is part of a terminal implementation and that provides a function to set the value of TargetDecLayerIdSet. In this example, the terminal implementation may comprise a decoder implementation and certain functions that are not parts of the decoder implementation.

In this way, a device (such as video encoder 20, video decoder 30, additional device 21, or another device) may select, from among a set of HRD parameters in a video parameter set and a set of HRD parameters in a SPS, a set of HRD parameters applicable to a particular operation point. In addition, the device may perform, based at least in part on the set of HRD parameters applicable to the particular operation point, a bitstream conformance test that tests whether a bitstream subset associated with the particular operation point conforms to a video coding standard.

As indicated in above, section E.2.2 of HEVC Working Draft 8 may be modified to indicate that when the hrd_parameters( ) syntax structure is included in a sequence parameter set, the applicable operation points are all the operation points with OpLayerIdSet identical to TargetDecLayerIdSet. Furthermore, as described above, TargetDecLayerIdSet is set to targetOpLayerIdSet, which contains the set of values of nuh_reserved_zero_6bits present in the bitstream subset associated with TargetOp. TargetOp is the operation point under test in a HRD operation. Furthermore, the HRD operations (e.g., a bitstream conformance test and a decoder conformance test) may invoke the general decoding process.

As explained above, section 8.1 of HEVC Working Draft 8 may be modified to provide that the sub-bitstream extraction process as specified in subclause 10.1 is applied with TargetDecHighestTid and TargetDecLayerIdSet as inputs and the output is assigned to a bitstream referred to as BitstreamToDecode. Hence, the only values of nuh_reserved_zero_6bits present in the BitstreamToDecode are the values of nuh_reserved_zero_6bits in TestDecLayerIdSet (i.e., the set of values of nuh_reserved_zero_6bits present in the bitstream subset associated with TargetOp). Section 8.1 further explains that when interpreting the semantics of each syntax element in each NAL unit and "the bitstream" or part thereof (e.g., a coded video sequence) is involved, the bitstream or part thereof means BitstreamToDecode or part thereof.

Hence, when interpreting the section describing the semantics of HRD parameters (e.g., section E.2.2 of HEVC Working Draft 8), the term "coded video sequence" means a part of the BitstreamToDecode. TargetDecLayerIdSet is equivalent to the set of all the values of nuh_reserved_zero_6bits present in the BitstreamToDecode. It follows that the phrase in the section describing the semantics of HRD parameters "when the hrd_parameters( ) syntax structure is included in a sequence parameter set, the applicable operation points are all the operation points with OpLayerIdSet identical to TargetDecLayerIdSet" is equivalent to "when the hrd_parameters( ) syntax structure is included in a sequence parameter set, the applicable operation points are all the operation points with OpLayerIdSet identical to the set of values of nuh_reserved_zero_6bits present in the BitstreamToDecode."

Because a "coded video sequence" is a part of the BitstreamToDecode, the set of nuh_reserved_zero_6bits present in the coded video sequence is a subset of the set of nuh_reserved_zero_6bits present in the BitstreamToDecode. Hence, the phrase "when the hrd_parameters( ) syntax structure is included in a sequence parameter set, the applicable operation points are all the operation points with OpLayerIdSet identical to the set of values of nuh_reserved_zero_6bits present in the BitstreamToDecode" necessarily entails "when the hrd_parameters( ) syntax structure is included in a sequence parameter set, the applicable operation points are all the operation points with OpLayerIdSet containing all values of nuh_reserved_zero_6bits present in the coded video sequence." In other words, if the set of nuh_reserved_zero_6bits of an operation point is identical to the set of nuh_reserved_zero_6bits present in the BitstreamToDecode, then the set of nuh_reserved_zero_6bits of the operation point necessarily contains all nuh_reserved_zero_6bits values present in a coded video sequence of the BitstreamToDecode. In this phrase, "the coded video sequence" may refer to a coded video sequence associated with the particular SPS.

When performing a HRD operation, the device may determine, from among the hrd_parameters( ) syntax structures indicated in a VPS and a hrd_parameters( ) syntax structure indicated in a SPS, a hrd_parameters( ) syntax structure applicable to TargetOp. A particular hrd_parameters( ) syntax structure in the VPS is applicable to TargetOp if the layer id set of TargetOp matches a set of layer identifiers specified in the VPS for the particular hrd_parameters( ) syntax structure. The hrd_parameters( ) syntax structure in the SPS may be applicable to TargetOp if the layer id set of TargetOp (i.e., TargetDecHighestTid) (i.e., the set of nuh_reserved_zero_6bits present in BitstreamToDecode) contains all nuh_reserved_zero_6bits present in the coded video sequence of the SPS (which is a subset of the set of nuh_reserved_zero_6bits in BitstreamToDecode). Because the set of nuh_reserved_zero_6bits of TargetOp may necessarily contain all nuh_reserved_zero_6bits values present in the coded video sequence associated with the SPS, the hrd_parameters( ) syntax structure in the SPS may always be applicable to TargetOp. However, not all SPS's have hrd_parameters( ) syntax structures. If a SPS does have an hrd_parameters( ) syntax structure and the set of nuh_reserved_zero_6bits present in BitstreamToDecode contains all nuh_reserved_zero_6bits present in the coded video sequence of the SPS, then the hrd_parameters( ) syntax structure of the SPS should be used. Because not all SPS's have hrd_parameters( ) syntax structures, the VPS may still be selected.

Furthermore, as shown above in modifications to section E.2.2 of HEVC Working Draft 8, when a device performs a bitstream conformance test, the video decoder may determine that the bitstream does not conform to the video coding standard when, for all sets of HRD parameters in a coded video sequence, more than one set of HRD parameters applies to the same operation point. In addition, when the device performs a bitstream conformance test, the video decoder may determine that the bitstream does not conform to the video coding standard when more than one set of HRD parameters in the VPS applies to the same operation point. Furthermore, when the device performs the bitstream decoding test, the device may determine that the bitstream does not conform to the video coding standard when the VPS includes a set of HRD parameters that applies to operation points having layer id sets containing only the value 0.

Figure 3:
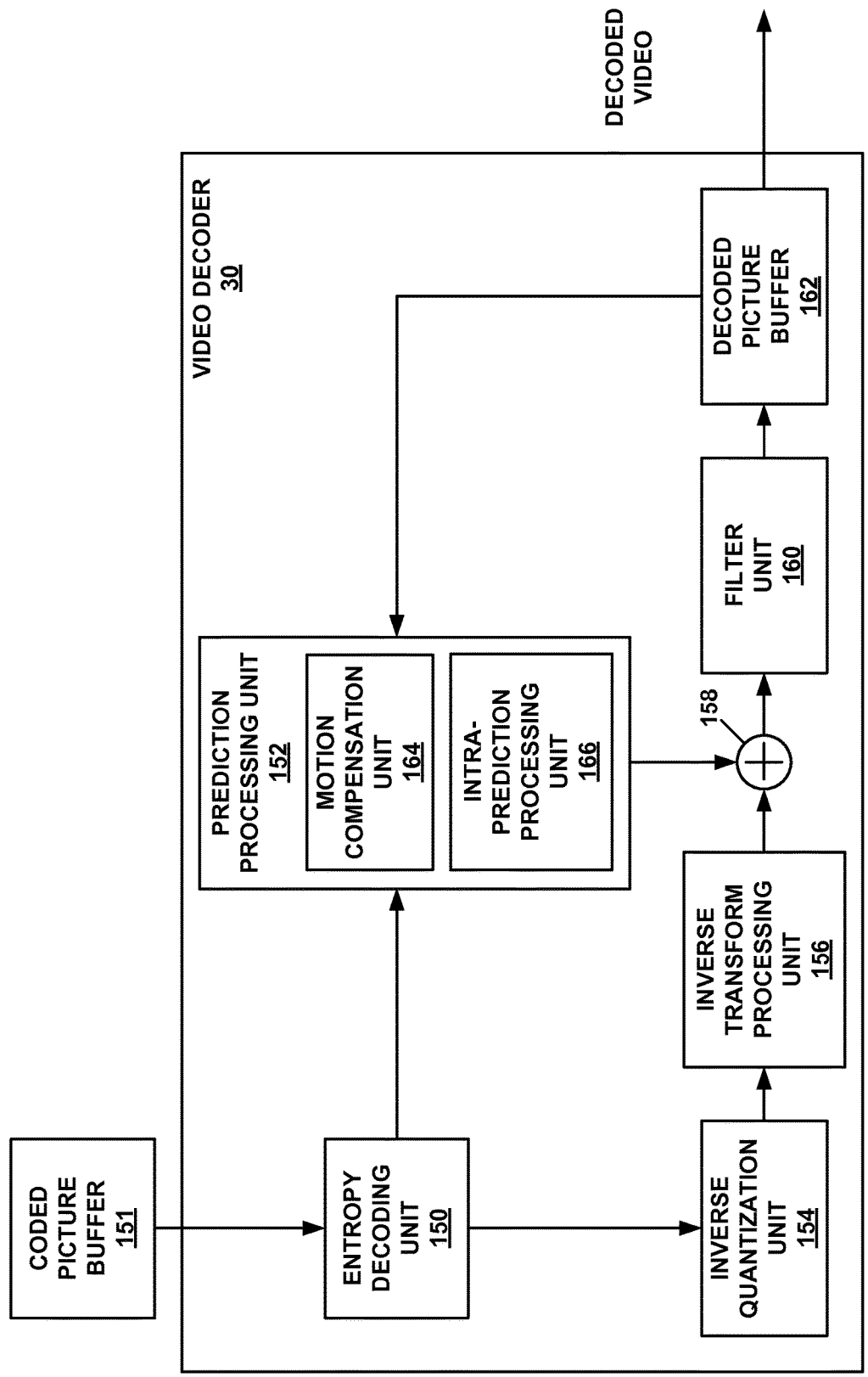
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may decode, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 4:
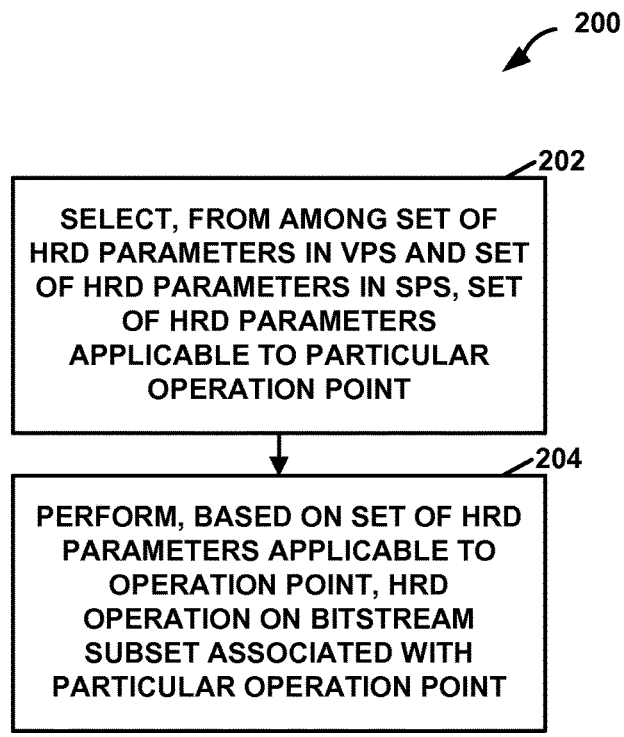
FIG. 4 is a flowchart illustrating an example operation of a device, in accordance with one or more techniques of this disclosure.

FIG. 4 is a flowchart illustrating an example operation 200 of a device, in accordance with one or more techniques of this disclosure. Operation 200 may be performed by video encoder 20, video decoder 30, additional device 21, or another device. As illustrated in the example of FIG. 4, the device may select, from among a set of Hypothetical HRD parameters (e.g., hrd_parameters syntax structures) in a VPS and a set of HRD parameters in a SPS, a set of HRD parameters applicable to a particular operation point of a bitstream (202). In addition, the device may perform, based at least in part on the set of HRD parameters applicable to the particular operation point, an HRD operation on a bitstream subset associated with the particular operation point (204). For example, the device may perform a bitstream conformance test or a decoder conformance test.

Figure 5:
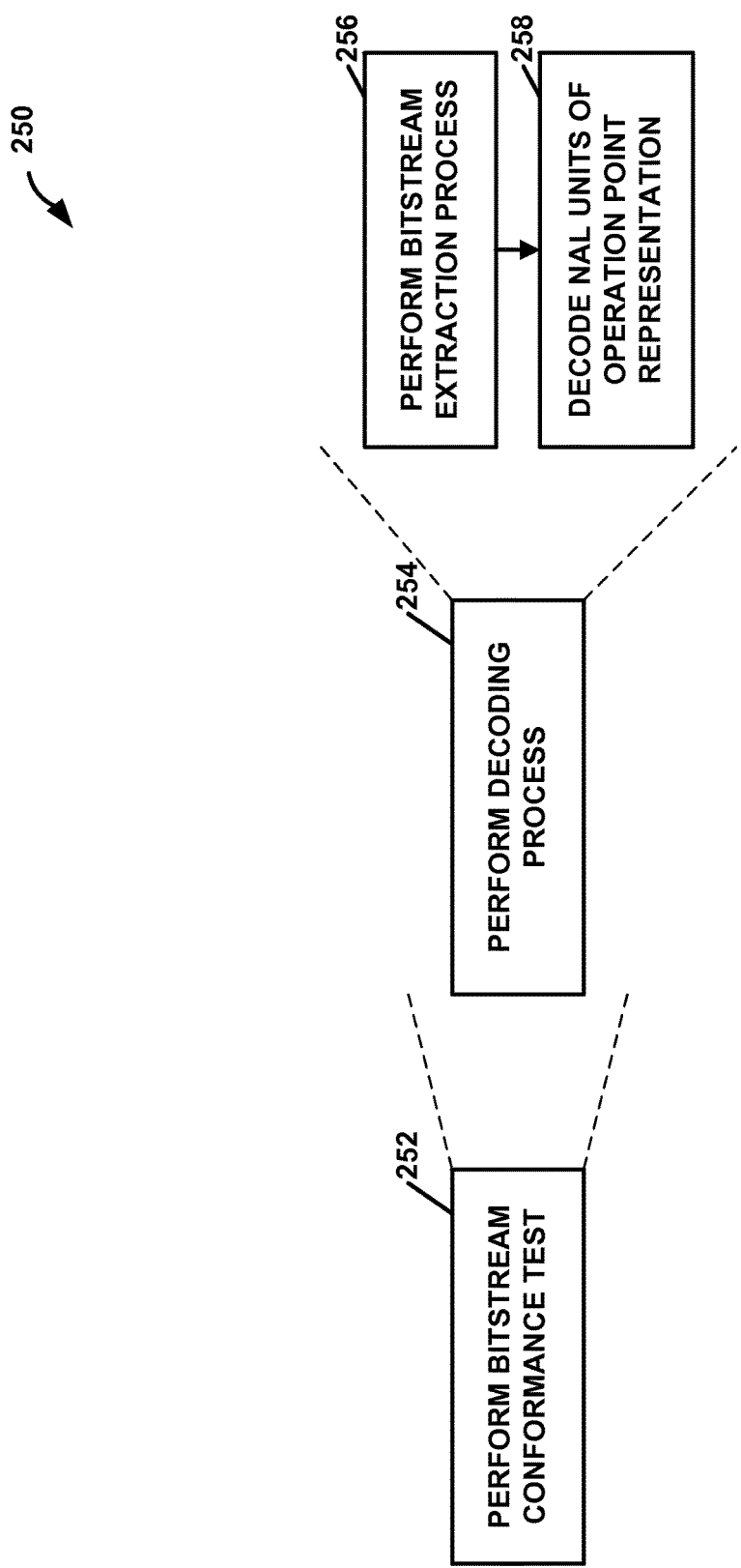
FIG. 5 is a flowchart illustrating an example operation of a device, in accordance with one or more techniques of this disclosure.

FIG. 5 is a flowchart illustrating an example operation 250 of a device, in accordance with one or more techniques of this disclosure. Operation 250 may be performed by video encoder 20, video decoder 30, additional device 21, or another device. As illustrated in the example of FIG. 5, the device may perform a bitstream conformance test that determines whether a bitstream conforms to a video coding standard (252). The device may perform a decoding process as part of performing a bitstream conformance test (254).

As illustrated in the example of FIG. 5, when performing the decoding process, the device may perform a bitstream extraction process to extract, from the bitstream, an operation point representation of an operation point defined by a target set of layer identifiers and a target highest temporal identifier (256). The target set of layer identifiers may contain values of layer identifier syntax elements present in the operation point representation. The target set of layer identifiers may be a subset of values of layer identifier syntax elements of the bitstream. The target highest temporal identifier may be equal to a greatest temporal identifier present in the operation point representation, the target highest temporal identifier being less than or equal to a greatest temporal identifier present in the bitstream. Furthermore, the device may decode NAL units of the operation point representation (258).

Figure 6:
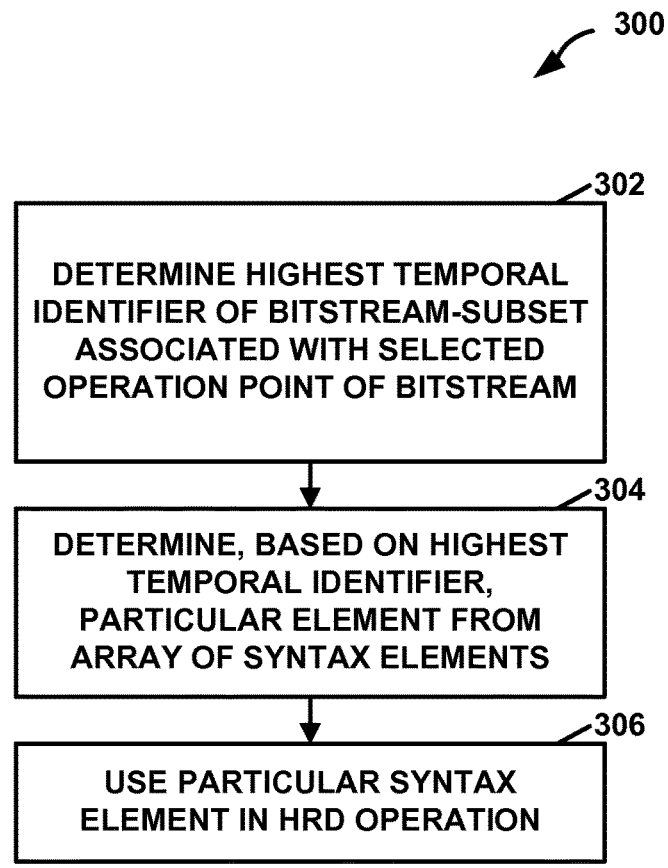
FIG. 6 is a flowchart illustrating an example hypothetical reference decoder (HRD) operation of a device, in accordance with one or more techniques of this disclosure.

FIG. 6 is a flowchart illustrating an example HRD operation 300 of a device, in accordance with one or more techniques of this disclosure. HRD operation 300 may be performed by video encoder 20, video decoder 30, additional device 21, or another device. Other devices may include a conformance bitstream checker that takes a bitstream as input, and outputs an indication of whether the input bitstream is a conforming bitstream or not. In some examples, HRD operation 300 may determine conformance of a bitstream to a video coding standard. In other examples, HRD operation 300 may determine conformance of a decoder to a video coding standard. As part of performing HRD operation 300, the device may determine a highest temporal identifier of a bitstream-subset associated with a selected operation point of a bitstream (302). In addition, the device may determine, based on the highest temporal identifier, a particular syntax element from among an array of syntax elements (e.g., sps_max_num_reorder_pics[i], sps_max_dec_pic_buffering[i], and cpb_cnt_minus1[i]) (304). The device may use the particular syntax element in the HRD operation (306).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    receiving a video parameter set (VPS) and a sequence parameter set (SPS), the VPS comprising a plurality of Hypothetical Reference Decoder (HRD) parameters syntax structures comprising respective sets of HRD parameters, the VPS further including, for each respective HRD parameters syntax structure in the VPS, syntax elements indicating a respective set of layer identifiers for the respective HRD parameters syntax structure, and the SPS comprising a HRD parameters syntax structure comprising a set of HRD parameters;
    selecting a set of HRD parameters applicable to a particular operation point, wherein the set of HRD parameters in the HRD parameters syntax structure in the SPS is applicable to the particular operation point based on a layer identifier set of the particular operation point being identical to a set of all layer identifiers present in a bitstream that is under test for a bitstream conformance test, and the set of HRD parameters in a particular HRD parameter syntax structure of the plurality of HRD parameters syntax structures in the VPS is applicable to the particular operation point based on the layer identifier set of the particular operation point being specified by the syntax elements indicating the layer identifiers for the particular HRD parameters syntax structure in the VPS; and
    performing an HRD operation using the selected set of HRD parameters.

2. The method of claim 1, wherein the set of HRD parameters applicable to the particular operation point includes at least parameters indicative of an initial coding picture buffer (CPB) removal delay, a CPB size, and a bit rate.

3. The method of claim 1, further comprising:
    determining a target temporal identifier of the particular operation point that is equal to a greatest temporal identifier present in the bitstream.

4. The method of claim 1, wherein performing the HRD operation comprises performing the bitstream conformance test, the bitstream conformance test determining whether the bitstream conforms to a video coding standard.

5. The method of claim 4, wherein performing the bitstream conformance test comprises determining that the bitstream does not conform to the video coding standard when, for all sets of HRD parameters in a coded video sequence, more than one of the sets of HRD parameters in the coded video sequence applies to the same operation point.

6. The method of claim 4, wherein performing the bitstream conformance test comprises determining that the bitstream does not conform to the video coding standard when more than one set of HRD parameters in the VPS applies to the same operation point.

7. The method of claim 4, wherein performing the bitstream conformance test comprises determining that the bitstream does not conform to the video coding standard when the VPS includes a set of HRD parameters that applies to operation points having layer identifier sets containing only the value 0.

8. A video processing device comprising:
    a storage medium storing encoded video data; and
    one or more processors configured to:
        receive a video parameter set (VPS) and a sequence parameter set (SPS), the VPS comprising a plurality of Hypothetical Reference Decoder (HRD) parameters syntax structures comprising respective sets of HRD parameters, the VPS further including, for each respective HRD parameters syntax structure in the VPS, syntax elements indicating a respective set of layer identifiers for the respective HRD parameters syntax structure, and the SPS comprising a HRD parameters syntax structure comprising a set of HRD parameters;
        select a set of HRD parameters applicable to a particular operation point, wherein the one or more processors are configured to determine that the set of HRD parameters in the HRD parameters syntax structure in the SPS is applicable to the particular operation point based on a layer identifier set of the particular operation point being identical to a set of all layer identifiers present in a bitstream that is under test for a bitstream conformance test, and configured to determine that the set of HRD parameters in a particular HRD parameter syntax structure of the plurality of HRD parameters syntax structures in the VPS is applicable to the particular operation point based on the layer identifier set of the particular operation point being specified by the syntax elements indicating the layer identifiers for the particular HRD parameters syntax structure in the VPS; and perform an HRD operation using the selected set of HRD parameters.

9. The video processing device of claim 8, wherein the set of HRD parameters applicable to the particular operation point includes at least parameters indicative of an initial coding picture buffer (CPB) removal delay, a CPB size, and a bit rate.

10. The video processing device of claim 8, wherein the one or more processors are configured to:
determine a target temporal identifier of the particular operation point that is equal to a greatest temporal identifier present in the bitstream.

11. The video processing device of claim 8, wherein the one or more processors are configured to perform the bitstream conformance test, the bitstream conformance test determining whether the bitstream conforms to a video coding standard.

12. The video processing device of claim 11, wherein the one or more processors are configured to determine that the bitstream does not conform to the video coding standard when, for all sets of HRD parameters in a coded video sequence, more than one of the sets of HRD parameters in the coded video sequence applies to the same operation point.

13. The video processing device of claim 11, wherein the one or more processors are configured to determine that the bitstream does not conform to the video coding standard when more than one set of HRD parameters in the VPS applies to the same operation point.

14. The video processing device of claim 11, wherein the one or more processors are configured to determine that the bitstream does not conform to the video coding standard when the VPS includes a set of HRD parameters that applies to operation points having layer identifier sets containing only the value 0.

15. A video processing device comprising:
means for receiving a video parameter set (VPS) and a sequence parameter set (SPS), the VPS comprising a plurality of Hypothetical Reference Decoder (HRD) parameters syntax structures comprising respective sets of HRD parameters, the VPS further including, for each respective HRD parameters syntax structure in the VPS, syntax elements indicating a respective set of layer identifiers for the respective HRD parameters syntax structure, and the SPS comprising a HRD parameters syntax structure comprising a set of HRD parameters;
means for selecting a set of HRD parameters applicable to a particular operation point, wherein the set of HRD parameters in the HRD parameters syntax structure in the SPS is applicable to the particular operation point based on a layer identifier set of the particular operation point being identical to a set of all layer identifiers present in a bitstream that is under test for a bitstream conformance test, and the set of HRD parameters in a particular HRD parameter syntax structure of the plurality of HRD parameters syntax structures in the VPS is applicable to the particular operation point based on the layer identifier set of the particular operation point being specified by the syntax elements indicating the layer identifiers for the particular HRD parameters syntax structure in the VPS; and
means for performing an HRD operation using the selected set of HRD parameters.

16. The video processing device of claim 15, further comprising:
means for determining a target temporal identifier of the particular operation point that is equal to a greatest temporal identifier present in the bitstream.

17. A non-transitory computer-readable data storage medium having instructions stored thereon that, when executed by one or more processors of a video processing device, configure the video processing device to:
receive a video parameter set (VPS) and a sequence parameter set (SPS), the VPS comprising a plurality of Hypothetical Reference Decoder (HRD) parameters syntax structures comprising respective sets of HRD parameters, the VPS further including, for each respective HRD parameters syntax structure in the VPS, syntax elements indicating a respective set of layer identifiers for the respective HRD parameters syntax structure, and the SPS comprising a HRD parameters syntax structure comprising a set of HRD parameters;
select a set of HRD parameters applicable to a particular operation point, wherein the set of HRD parameters in the HRD parameters syntax structure in the SPS is applicable to the particular operation point based on a layer identifier set of the particular operation point being identical to a set of all layer identifiers present in the bitstream that is under test for a bitstream conformance test, and the set of HRD parameters in a particular HRD parameter syntax structure of the plurality of HRD parameters syntax structures in the VPS is applicable to the particular operation point based on the layer identifier set of the particular operation point being specified by the syntax elements indicating the layer identifiers for the particular HRD parameters syntax structure in the VPS; and
perform an HRD operation using the selected set of HRD parameters.

18. The non-transitory computer-readable data storage medium of claim 17, wherein the instructions configure the video processing device to:
determine a target temporal identifier of the particular operation point that is equal to a greatest temporal identifier present in the bitstream.

19. The method of claim 1, wherein the HRD operation determines conformance of the bitstream to a video coding standard or determines conformance of a video decoder to the video coding standard.

* * * * *